US011320729B2

(12) United States Patent
Shimizu

(10) Patent No.: US 11,320,729 B2
(45) Date of Patent: May 3, 2022

(54) PROJECTION APPARATUS

(71) Applicant: FUJIFILM Corporation, Tokyo (JP)

(72) Inventor: Hitoshi Shimizu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/142,021

(22) Filed: Jan. 5, 2021

(65) Prior Publication Data

US 2021/0124251 A1    Apr. 29, 2021

Related U.S. Application Data

(63) Continuation of application No. PCT/JP2019/021375, filed on May 29, 2019.

(30) Foreign Application Priority Data

Jul. 27, 2018 (JP) .............................. JP2018-141573

(51) Int. Cl.
*G03B 21/14*    (2006.01)
*G03B 21/28*    (2006.01)
(Continued)

(52) U.S. Cl.
CPC ............. *G03B 21/28* (2013.01); *G02B 26/08* (2013.01); *H04N 5/74* (2013.01)

(58) Field of Classification Search
CPC ........ G03B 21/14; G03B 21/00; G03B 21/28; G03B 21/101; G03B 21/142; H04N 9/31; H04N 9/74; H04N 5/74; G02B 26/08
(Continued)

(56) References Cited

U.S. PATENT DOCUMENTS

| 2005/0030494 A1 | 2/2005 | Kumai |
| 2007/0081131 A1 | 4/2007 | Van Der Palen et al. |
| 2019/0025679 A1 | 1/2019 | Kuroda |
| 2019/0219802 A1* | 7/2019 | Kuroda .................. H04N 5/74 |
| 2019/0219915 A1* | 7/2019 | Kayano ................ G02B 17/008 |

(Continued)

FOREIGN PATENT DOCUMENTS

| JP | 2005-55812 A | 3/2005 |
| JP | 2007-515881 A | 6/2007 |

(Continued)

OTHER PUBLICATIONS

Japanese Office Action, dated Mar. 2, 2021, for corresponding Japanese Application No. 2020-532183, with an English translation.
International Preliminary Report on Patentability (Form PCT/IPEA/409) for corresponding International Application No. PCT/JP2019/021375, dated Jan. 9, 2020, with an English translation.

(Continued)

*Primary Examiner* — William C. Dowling
(74) *Attorney, Agent, or Firm* — Birch, Stewart, Kolasch & Birch, LLP

(57) ABSTRACT

A projection apparatus having a light modulation element includes a main body; an optical unit that is rotatably supported by the main body and includes a projection optical system for projecting the spatially modulated light onto the projection surface, a first rotation member rotatably supported to the main body and a second rotation member rotatably supported to the first rotation member; a first sensor; a second sensor; a controller; and a regulation mechanism, and the regulation mechanism includes a moving member that is movable between a regulation position for regulating the rotation and a regulation release position for releasing the regulating of the rotation, and fixes the moving member at the regulation position in a case where the controller determines that the first rotation member and (Continued)

the second rotation member are in the predetermined specific rotation state.

20 Claims, 20 Drawing Sheets

(51) Int. Cl.
*H04N 5/74* (2006.01)
*G02B 26/08* (2006.01)
(58) Field of Classification Search
USPC .................................................... 353/101
See application file for complete search history.

(56) References Cited

U.S. PATENT DOCUMENTS

| | | | |
|---|---|---|---|
| 2019/0346750 A1 | 11/2019 | Kuroda | |
| 2020/0292922 A1* | 9/2020 | Amano | .................... H04N 5/74 |
| 2020/0292924 A1* | 9/2020 | Amano | ................ H04N 9/3194 |

FOREIGN PATENT DOCUMENTS

| | | |
|---|---|---|
| JP | 2008-191196 A | 8/2008 |
| JP | 2012-98506 A | 5/2012 |
| JP | 2014-56082 A | 3/2014 |
| JP | 2016-136196 A | 7/2016 |
| JP | 2017-142281 A | 8/2017 |
| WO | WO 2317/169903 A1 | 10/2017 |
| WO | WO 2018/055963 A1 | 3/2018 |
| WO | WO 2018/055964 A1 | 3/2018 |

OTHER PUBLICATIONS

International Search Report and Written Opinion of the International Searching Authority (Forms PCT/ISA/210 and PCT/ISA/237) for corresponding International Application No. PCT/JP2019/021375, dated Aug. 20, 2019, with English translation of the Search Report.

* cited by examiner

PROJECTION APPARATUS

CROSS REFERENCE TO RELATED APPLICATION

This is a continuation of International Application No. PCT/JP2019/021375 filed on May 29, 2019, and claims priority from Japanese Patent Application No. 2018-141573 filed on Jul. 27, 2018, the entire disclosures of which are incorporated herein by reference.

BACKGROUND OF THE INVENTION

1. Field of the Invention

The present invention relates to a projection apparatus.

2. Description of the Related Art

Some projection apparatuses such as liquid crystal projectors can rotate the main body of the projection apparatus or a part of an optical system.

For example, JP2012-098506A discloses a projection apparatus in which an optical part for accommodating a projection optical system for forming an optical path bent twice is provided so as to protrude from a housing, and a part of the optical part is rotated to change the projection direction in a surface horizontal to the vertical direction.

JP2008-191196A discloses a projection apparatus having a plurality of rotation axes for changing a posture between in a case of being stored and in a case of being used.

JP2005-055812A discloses a projector in which a projection unit is rotatably configured with respect to a base unit. The projector has a locking mechanism for fixing the postures of the projection unit and the base unit at a storage position and a projection position.

JP2014-056082A discloses a projector equipped with a rotatable camera. The projector has a locking mechanism for locking a camera at a storage position and a usage position.

SUMMARY OF THE INVENTION

JP2012-098506A discloses the projection apparatus in which the projection direction can be changed by one rotation axis, but in a case where there is a projection apparatus in which the projection direction can be changed by a plurality of rotation axes, variations in the projection direction can be widened and convenience can be improved. However, in a case where the projection optical system is rotated by a plurality of rotation axes, an orientation of a projection lens, which is an optical member closest to a projection surface, can be changed in various directions. Therefore, depending on a rotation state, the projection lens may hit an obstacle and be damaged.

The apparatuses disclosed in JP2012-098506A, JP2005-055812A, and JP2014-056082A are not capable of changing the projection direction by a plurality of rotation axes, and the above-disclosed problems do not occur. The apparatus disclosed in JP2008-191196A has a plurality of rotation axes, but there is one rotation axis for changing the projection direction, and the above-disclosed problems are unlikely to occur.

The present invention has been made in view of the above circumstances, and an object of the present invention is to provide a projection apparatus capable of changing the projection direction in various ways and preventing damage to the projection optical system.

The projection apparatus according to an aspect of the present invention is a projection apparatus having a light modulation element that spatially modulates light on the basis of image data, and projecting the spatially modulated light onto a projection surface, the projection apparatus comprising a main body; an optical unit that is rotatably supported by the main body and includes a projection optical system for projecting the spatially modulated light onto the projection surface, the optical unit including a first rotation member rotatably supported to the main body, and a second rotation member rotatably supported to the first rotation member; and a regulation mechanism that regulates at least one of rotation of the first rotation member or rotation of the second rotation member, in which the regulation mechanism includes a moving member that is movable between a regulation position for regulating the rotation and a regulation release position for releasing regulation of the rotation, and a regulation releasing restriction unit that fixes the moving member at the regulation position in a case where the first rotation member and the second rotation member are in a predetermined specific rotation state.

According to the present invention, it is possible to provide a projection apparatus capable of changing the projection direction in various ways and preventing damage to the projection optical system.

DESCRIPTION OF THE PREFERRED EMBODIMENTS

Hereinafter, embodiments of the present invention will be described with reference to the drawings.

Figure 1:
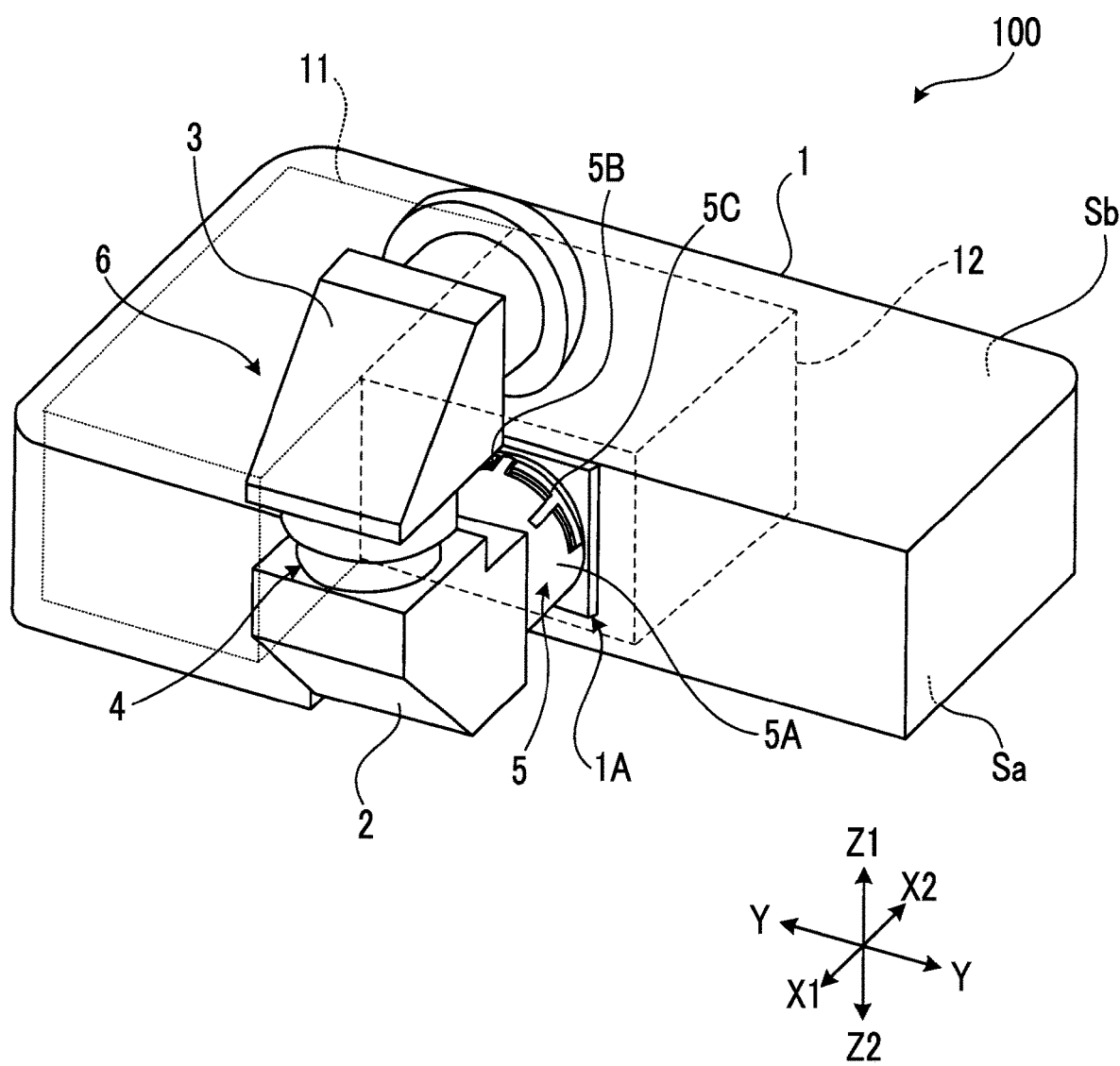
FIG. 1 is a schematic view showing an external configuration of a projector 100, which is an embodiment of a projection apparatus according to the embodiment of the present invention.
Figure 2:
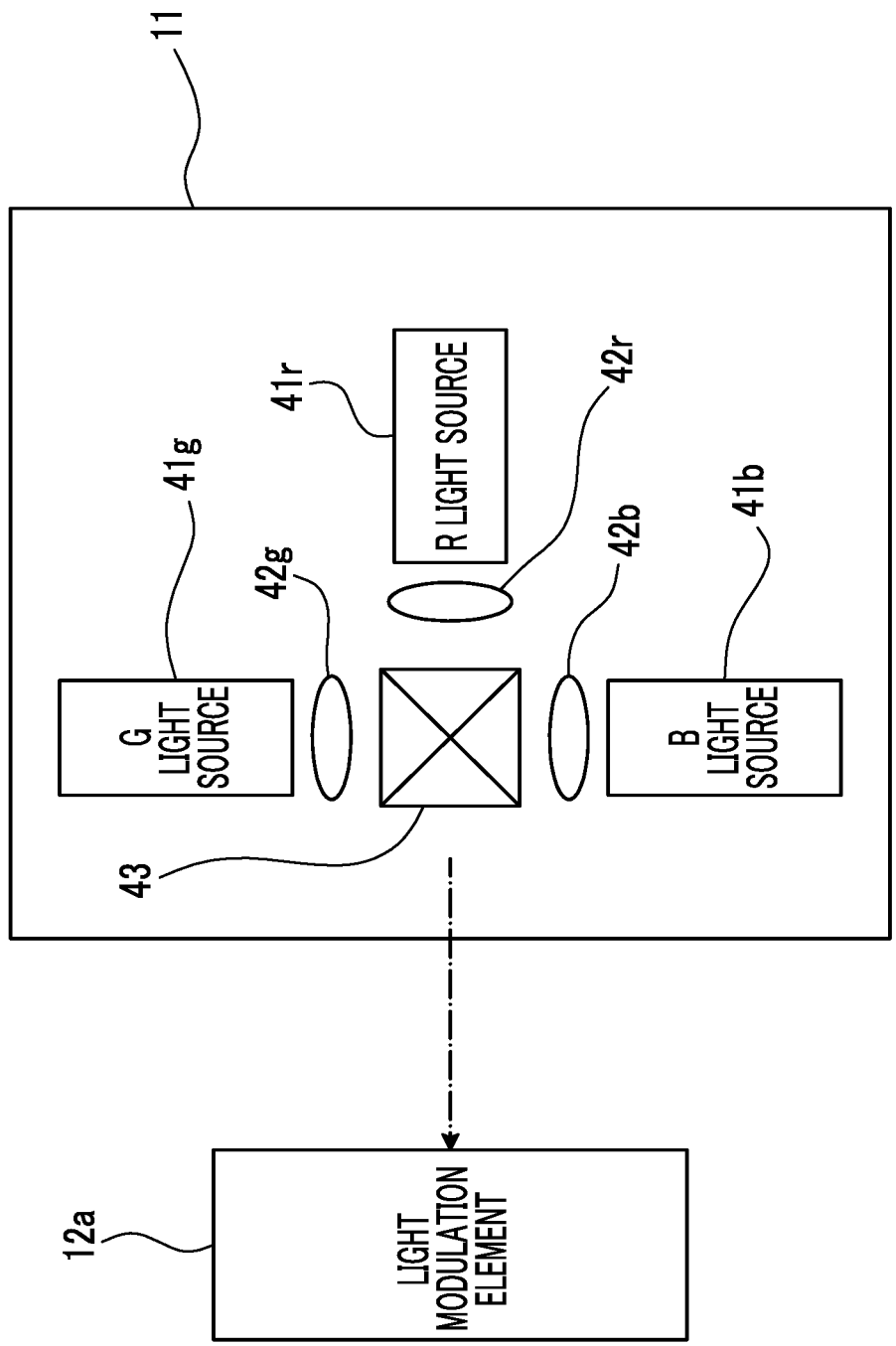
FIG. 2 is a schematic view showing an example of an internal configuration of a light source unit 11 in the projector 100 shown in FIG. 1.
Figure 3:
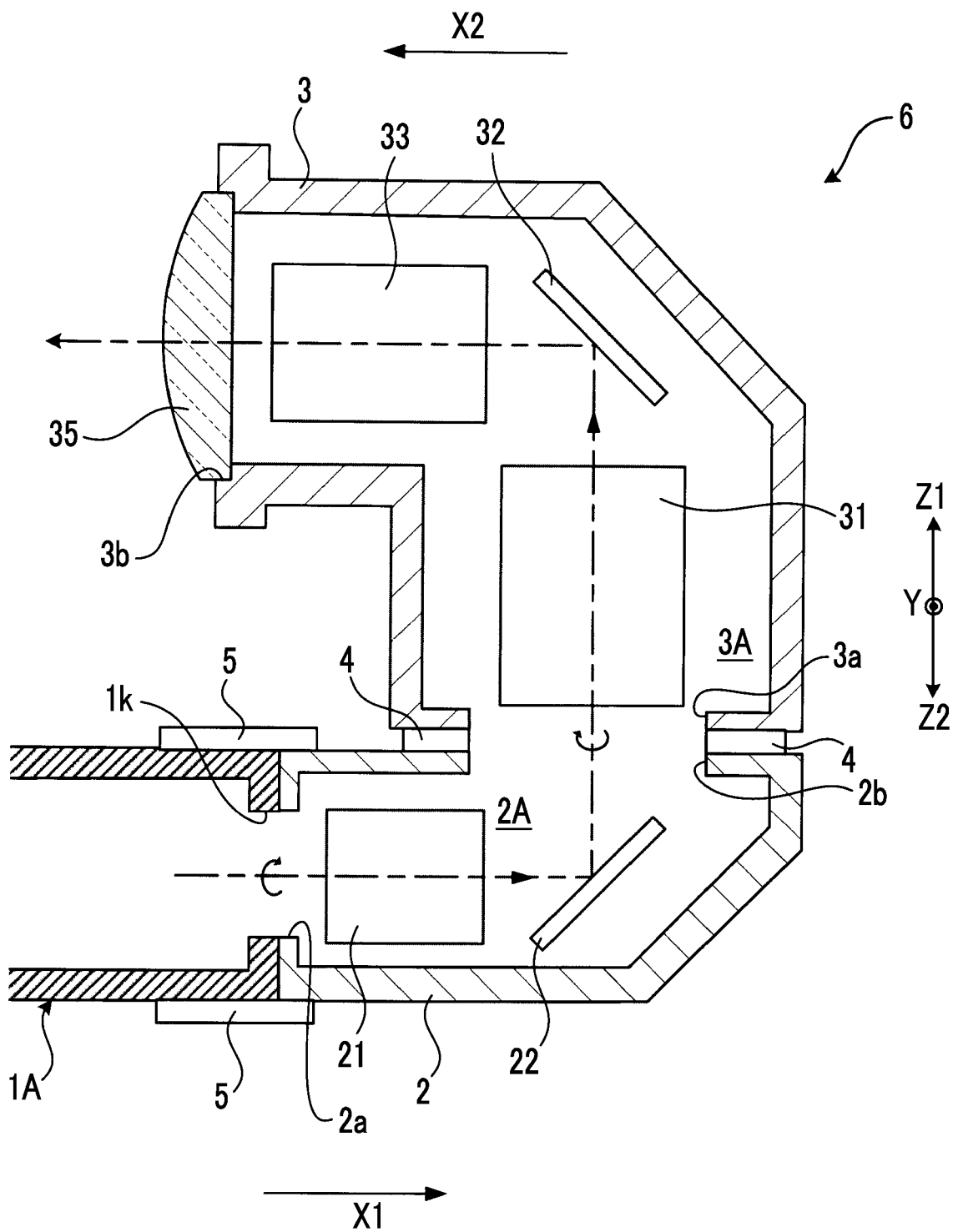
FIG. 3 is a schematic cross-sectional view of an optical unit 6 of the projector 100 shown in FIG. 1.

FIG. 1 is a schematic view showing an external configuration of a projector 100, which is an embodiment of a projection apparatus according to the embodiment of the present invention. FIG. 2 is a schematic view showing an example of an internal configuration of a light source unit 11 in the projector 100 shown in FIG. 1. FIG. 3 is a schematic cross-sectional view of an optical unit 6 of the projector 100 shown in FIG. 1. FIG. 3 shows a cross section taken along an optical path of light emitted from a housing 1.

As shown in FIG. 1, the projector 100 comprises an L-shaped housing 1, a tubular member 1A with flange fixed to the housing 1 and provided so as to protrude from the housing 1, and an optical unit 6 rotatably configured with respect to the tubular member 1A. The main body of the projector 100 is configured by the housing 1 and the tubular member 1A.

The housing 1 is formed with an aperture (not shown) for passing light through a portion to which the tubular member 1A is fixed, and the aperture and the hollow portion of the tubular member 1A face each other.

As shown in FIG. 1, a light source unit 11 and a light modulation unit 12 including a light modulation element 12a (refer to FIG. 2) which spatially modulates light emitted from the light source unit 11 on the basis of image data are provided in the housing 1.

In the example shown in FIG. 2, the light source unit 11 comprises an R light source 41r, which is a red light source that emits red light, a G light source 41g, which is a green light source that emits green light, a B light source 41b, which is a blue light source that emits blue light, a dichroic prism 43, a collimator lens 42r provided between the R light source 41r and the dichroic prism 43, a collimator lens 42g provided between the G light source 41g and the dichroic prism 43, and a collimator lens 42b provided between the B light source 41b and the dichroic prism 43.

The dichroic prism 43 is an optical member for guiding the light emitted from each of the R light source 41r, the G light source 41g, and the B light source 41b to the same optical path. That is, the dichroic prism 43 transmits the red light parallelized by the collimator lens 42r and emits it to the light modulation element 12a of the light modulation unit 12. In addition, the dichroic prism 43 reflects the green light parallelized by the collimator lens 42g and emits it to the light modulation element 12a of the light modulation unit 12. Further, the dichroic prism 43 reflects the blue light parallelized by the collimator lens 42b and emits it to the light modulation element 12a of the light modulation unit 12. The optical member having such a function is not limited to a dichroic prism. For example, a cross dichroic mirror may be used.

As the R light source 41r, the G light source 41g, and the B light source 41b, a light emitting element such as a laser or a light emitting diode (LED) is used, respectively. The number of light sources included in the light source unit 11 may be one, two, or four or more.

As the light modulation element 12a included in the light modulation unit 12, a digital micromirror device (DMD) is used, for example, in the case of the configuration of the light source unit 11 of FIG. 2. As the light modulation element 12a, a liquid crystal on silicon (LCOS) element, a micro electro mechanical systems (MEMS) element, a liquid crystal display element, or the like can also be used. The light spatially modulated by the light modulation unit 12 passes through the aperture of the housing 1, passes through the hollow portion of the tubular member 1A, and is incident on the optical unit 6.

As shown in FIG. 1 and FIG. 3, the optical unit 6 comprises a first rotation member 2 rotatably supported by the tubular member 1A and having a hollow portion 2A connected to the inside of the tubular member 1A, a second rotation member 3 rotatably supported by the first rotation member 2 and having a hollow portion 3A connected to the hollow portion 2A, a first optical system 21 and a first reflecting member 22 arranged in the hollow portion 2A, a second optical system 31, a second reflecting member 32, a third optical system 33, and a lens 35 arranged in the hollow portion 3A, a rotation mechanism 4, and a rotation mechanism 5. The first optical system 21, the first reflecting member 22, the second optical system 31, the second reflecting member 32, the third optical system 33, and the lens 35 constitute a projection optical system.

The first rotation member 2 is formed with an aperture 2a at a position facing an aperture 1k of the tubular member 1A. The light emitted from the light modulation unit 12 inside the housing 1 is incident on the hollow portion 2A of the first rotation member 2 through the aperture 1k of the tubular member 1A and the aperture 2a of the first rotation member 2. An incidence direction of the light incident on the hollow portion 2A from the tubular member 1A is defined as a direction X1, and a direction opposite to the direction X1 is defined as a direction X2. The direction X1 constitutes the first direction.

The first reflecting member 22 arranged in the hollow portion 2A of the first rotation member 2 reflects the light incident from the tubular member 1A in a direction Z1 which is the direction perpendicular to the direction X1. The first reflecting member 22 is configured by, for example, a half mirror, a beam splitter, a polarizing member, or the like. In FIG. 1 and FIG. 3, the direction opposite to the direction Z1 is defined as the direction Z2. The direction Z1, which is a direction of light reflection by the first reflecting member 22, constitutes the second direction.

The projector 100 is used in either a first installation form in which the housing 1 is installed on a placing table or the like with a surface Sa of the housing 1 facing the placing table or the like such that the direction X1 is perpendicular to the vertical direction, or a second installation form in which the housing 1 is installed on the placing table or the like with a surface Sb (a surface perpendicular to the surface Sa) of the housing 1 facing the placing table or the like such that the direction X1 is opposite to the vertical direction. FIG. 1 shows the first installation form in which the housing 1 is installed on the placing table with the surface Sa in contact with the placing table such as a table.

The first optical system 21 arranged in the hollow portion 2A of the first rotation member 2 is arranged between the first reflecting member 22 and the tubular member 1A, and includes at least one lens.

In the projector 100 in the state shown in FIG. 1, the light advancing in the direction X1 made incident on the first rotation member 2 from the tubular member 1A passes through the first optical system 21, is reflected by the first reflecting member 22, and advances in the direction Z1. The first rotation member 2 has an aperture 2b formed on the optical path of the light reflected by the first reflecting member 22, and the reflected light passes through the aperture 2b and proceeds to the hollow portion 3A of the second rotation member 3.

The rotation mechanism 5 is a mechanism for rotatably connecting the first rotation member 2 to the tubular member 1A. The first rotation member 2 is rotatably configured around a rotation axis (specifically, an axis extending in the direction X1 passing through a center of the aperture 2a) parallel to the direction X1 with respect to the tubular member 1A by the rotation mechanism 5.

The first rotation member 2 can be rotated by 180 degrees clockwise from the state shown in FIG. 1 by the rotation mechanism 5. Hereinafter, the rotational position of the first rotation member 2 shown in FIG. 1 is referred to as a rotational position by 0 degree. In addition, the rotational position of the first rotation member 2 in a case where the first rotation member 2 is rotated by 90 degree clockwise from the state shown in FIG. 1 is referred to as a rotational position by 90 degree. In addition, the rotational position of the first rotation member 2 in a case where the first rotation member 2 is rotated by 180 degree clockwise from the state shown in FIG. 1 is referred to as a rotational position by 180 degree.

The rotation mechanism 4 is a mechanism for rotatably connecting the second rotation member 3 to the first rotation member 2. The second rotation member 3 is configured to be rotatable 360 degree, with respect to the first rotation member 2, around the rotation axis (Specifically, an axis extending in a direction Z1 passing through the center of the aperture 2b) parallel to the direction of light reflection (a direction Z1) of the first reflecting member 22 by the rotation mechanism 4.

The second rotation member 3 is formed with an aperture 3a at a position facing the aperture 2b of the first rotation member 2. The light from the tubular member 1A that has passed through the aperture 2b of the first rotation member 2 is incident on the hollow portion 3A of the second rotation member 3 through the aperture 3a.

The second reflecting member 32 arranged in the hollow portion 3A of the second rotation member 3 reflects the light incident from the first rotation member 2 in a third direction (the direction X2 in the state shown in FIG. 1) perpendicular to the incidence direction (the direction Z1). The second reflecting member 32 is configured by, for example, a half mirror, a beam splitter, a polarizing member, or the like.

The second optical system 31 arranged in the hollow portion 3A of the second rotation member 3 is arranged between the second reflecting member 32 and the first rotation member 2, and includes at least one lens.

The lens 35 arranged in the hollow portion 3A of the second rotation member 3 is arranged at an end portion so as to cover the aperture 3b formed at the end portion (the end portion on the projection surface side) opposite to the aperture 3a side of the second rotation member 3. The lens 35 is arranged in an advancing direction of the light reflected by the second reflecting member 32, and the light emitted from the lens 35 is projected onto the projection surface. The lens 35 constitutes the optical member.

The third optical system 33 arranged in the hollow portion 3A of the second rotation member 3 is arranged between the lens 35 and the second reflecting member 32, and includes at least one lens.

The light from the tubular member 1A incident on the hollow portion 3A of the second rotation member 3 passes through the second optical system 31, and is reflected by the second reflecting member 32. Then, the light advances to the direction X2 in the example of FIG. 1, passes through the third optical system 33, and is projected from the lens 35 toward the projection surface.

Figure 4:
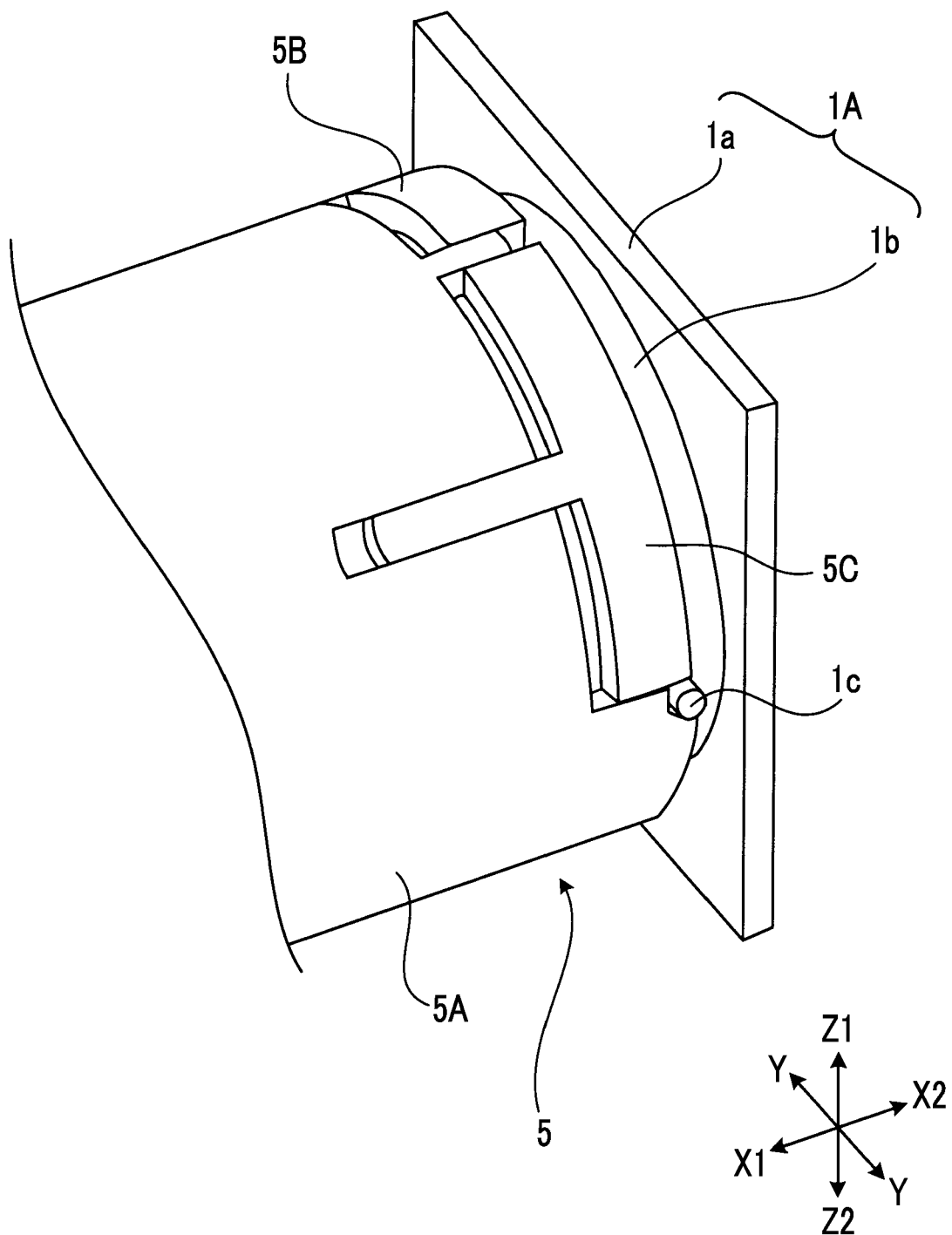
FIG. 4 is a partially enlarged view of a vicinity of a rotation mechanism 5 in the projector 100 shown in FIG. 1.
Figure 5:
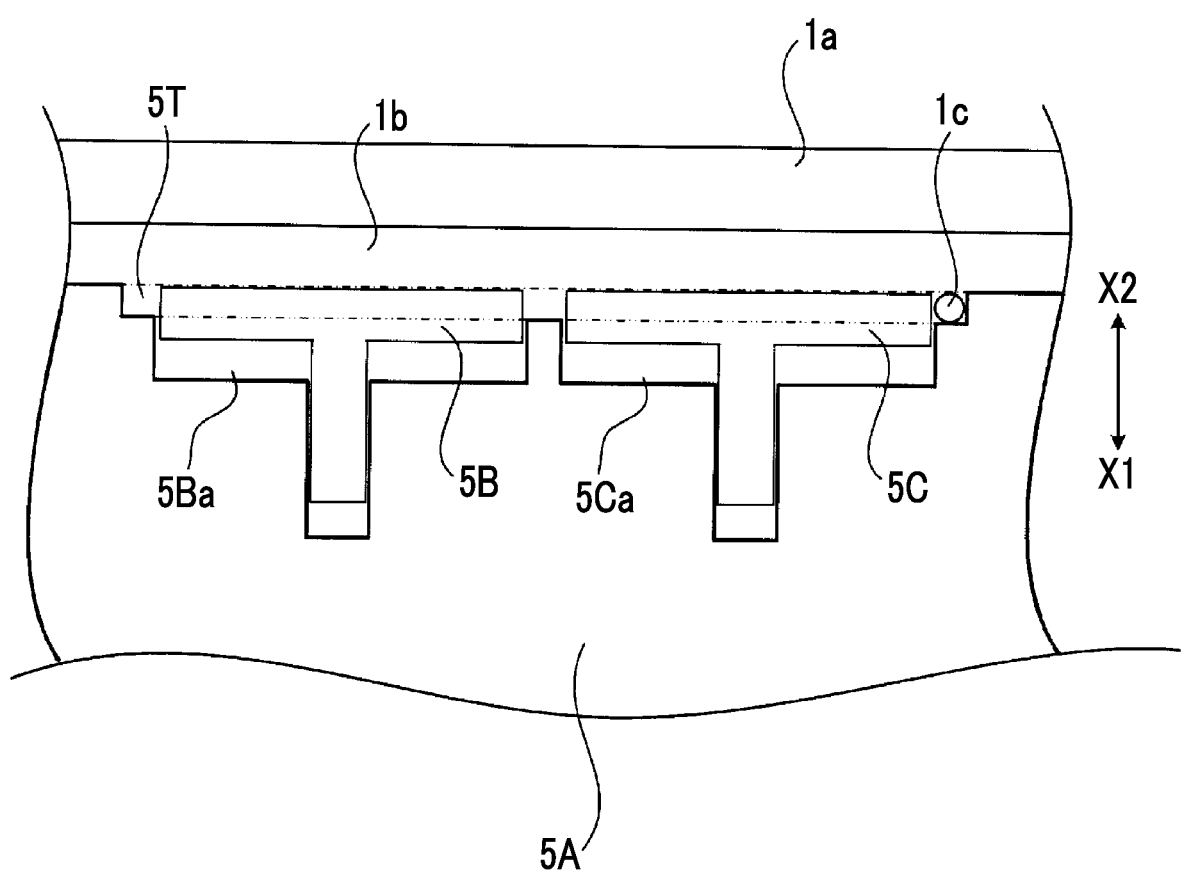
FIG. 5 is a developed schematic view of the rotation mechanism 5 in the state shown in FIG. 4 in the direction Z2.
Figure 6:
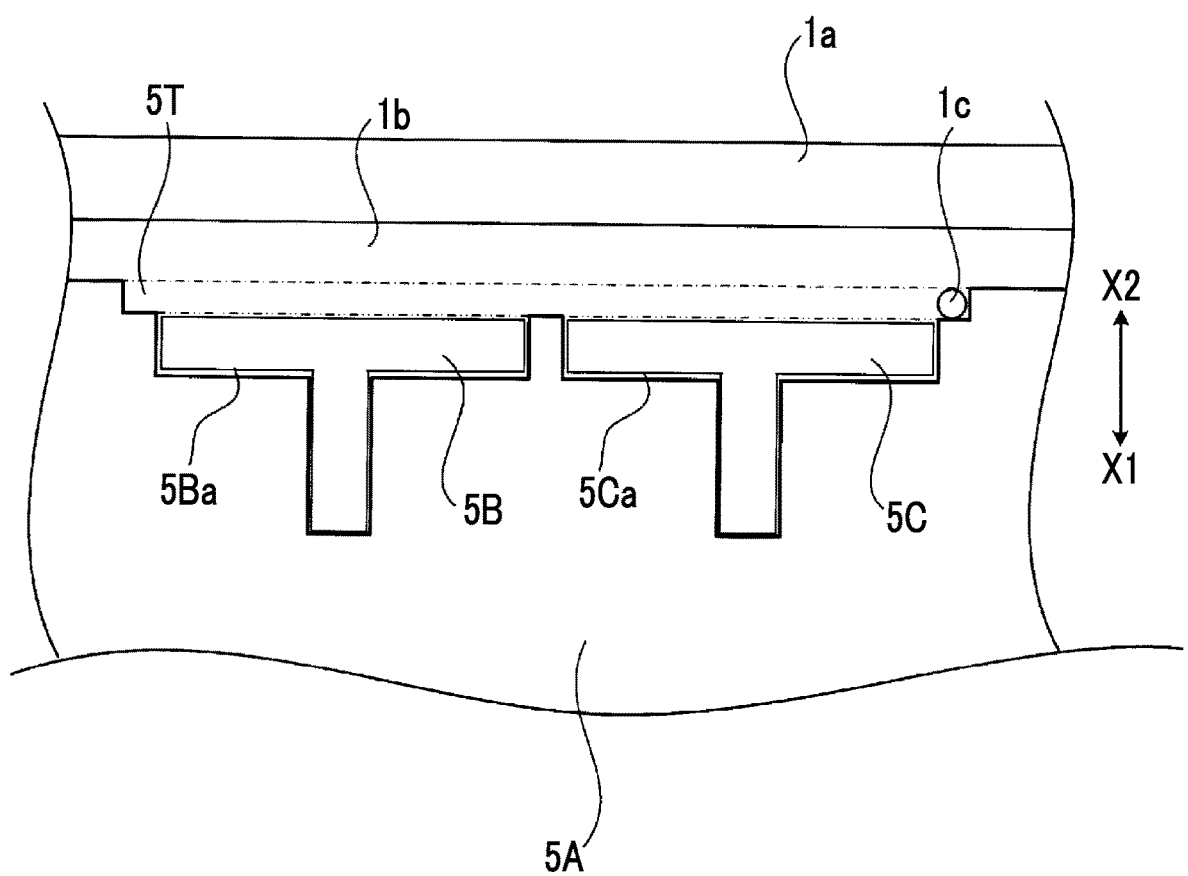
FIG. 6 is a developed schematic view showing a state in which a moving member 5B and a moving member 5C are moved from the state shown in FIG. 5 to a regulation release position.

FIG. 4 is a partially enlarged view of a vicinity of a rotation mechanism 5 in the projector 100 shown in FIG. 1. FIG. 5 is a developed schematic view of the rotation mechanism 5 in the state shown in FIG. 4 in the direction Z2. FIG. 6 is a developed schematic view showing a state in which a moving member 5B and a moving member 5C are moved from the state shown in FIG. 5 to a regulation release position.

As shown in FIG. 4, the tubular member 1A is configured by a flange portion 1a fixed to the housing 1 and a cylindrical portion 1b protruding in the direction X1 from the flange portion 1a. A protrusion 1c is formed on an outer peripheral surface of the cylindrical portion 1b.

As shown in FIG. 4 and FIG. 5, the rotation mechanism 5 comprises a cylindrical rotational member 5A fixed to the first rotation member 2, and a T-shaped moving member 5B and a moving member 5C supported by the rotational member 5A in a state movable in the direction X1 and the direction X2.

The rotational member 5A has the cylindrical portion 1b arranged at an inner peripheral portion thereof, and is rotatably configured in a circumferential direction of the cylindrical portion 1b while the inner peripheral surface slides with respect to an outer peripheral surface of the cylindrical portion 1b.

As shown in FIG. 5 and FIG. 6, a groove portion 5T, a groove portion 5Ba, and a groove portion 5Ca are formed on the outer peripheral surface of the rotational member 5A.

The groove portion 5T is a linear groove formed at an end portion of the rotational member 5A on the flange portion 1a side so as to extend along the circumferential direction of the rotational member 5A. The protrusion 1c formed on the cylindrical portion 1b is arranged on the moving path of the groove portion 5T in a case where the rotational member 5A rotates.

The groove portion 5Ba and the groove portion 5Ca are substantially T-shaped grooves formed toward the direction X1 from the end portion of the groove portion 5T opposite to the flange portion 1a side, respectively. Each of the groove portion 5Ba and the groove portion 5Ca is formed side by side in the circumferential direction of the rotational member 5A.

Each of the moving member 5B and the moving member 5C can be electrically driven by a driving unit 5D (refer to FIG. 7) described later to take a state in which the moving member 5B and the moving member 5C are moved to a position where they overlap with the groove portion 5T, as shown in FIG. 5, and a state in which the moving member 5B and the moving member 5C are moved to a position where they do not overlap with the groove portion 5T, as shown in FIG. 6.

In the state shown in FIG. 6 in which each of the moving member 5B and the moving member 5C is moved to positions where they do not overlap the groove portion 5T, the rotational member 5A is rotatable within a range where both ends of the rotational member 5A in the circumferential direction in the groove portion 5T abut the protrusion 1c. On the other hand, in the state shown in FIG. 5 in which each of the moving member 5B and the moving member 5C is moved to a position where they overlap the groove portion 5T, the protrusion 1c is arranged between the moving member 5C and the side wall of the groove portion 5T, so that the rotational member 5A cannot rotate.

In the state in which the moving member 5B and the moving member 5C are moved to positions where they overlap the groove portion 5T, the rotation (in other words, the rotation of the first rotation member 2) of the rotational member 5A is regulated, and in the state in which the moving member 5B and the moving member 5C are moved to positions where they do not overlap the groove portion 5T, the regulation of the rotation (in other words, the rotation of the first rotation member 2) of the rotational member 5A is released.

That is, each of the moving member 5B and the moving member 5C is members movable between a regulation position (a movement position shown in FIG. 5) for regulating the rotation of the first rotation member 2 and the regulation release position (movement position shown in FIG. 6) for releasing the regulation on the rotation of the first rotation member 2.

Figure 7:
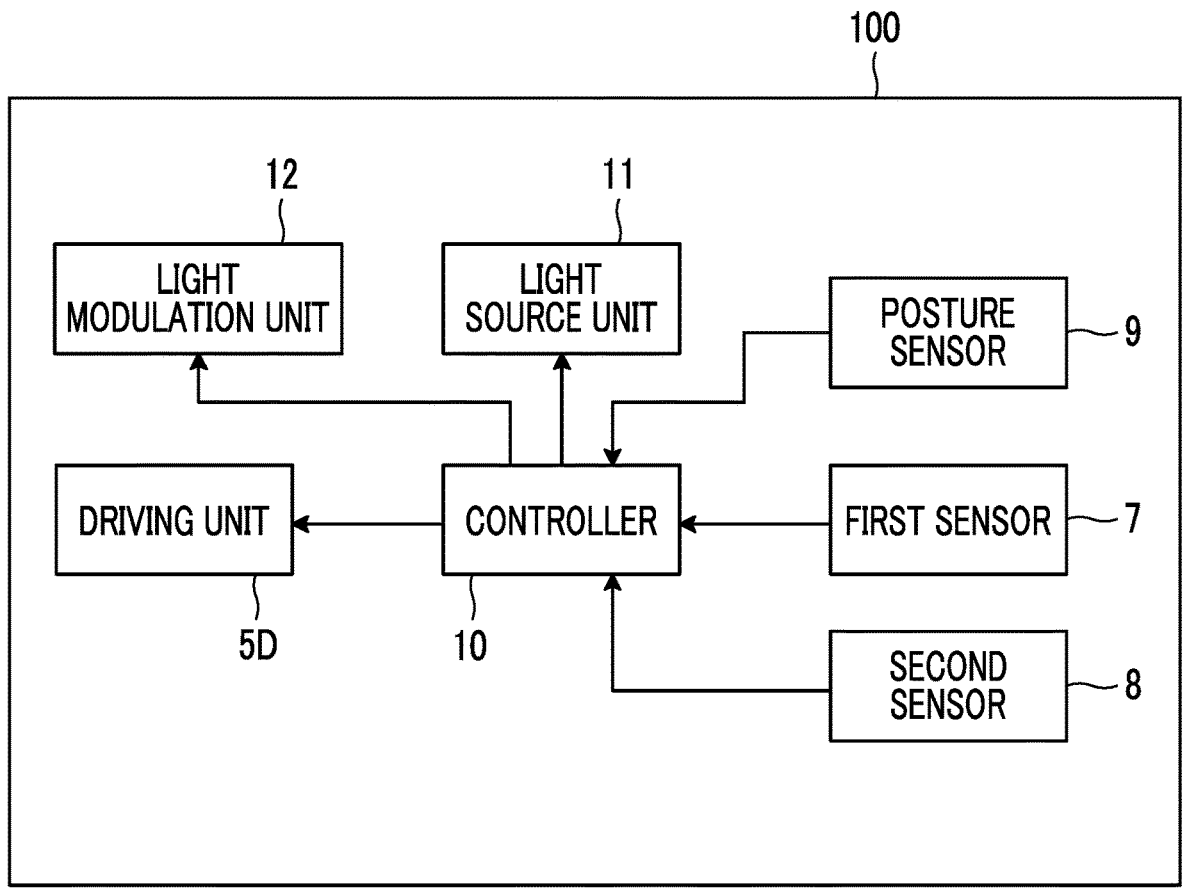
FIG. 7 is a view showing an internal block configuration of the projector 100 shown in FIG. 1.

FIG. 7 is a view showing an internal block configuration of the projector 100 shown in FIG. 1. As shown in FIG. 7, the projector 100 comprises a light source unit 11, a light modulation unit 12, a driving unit 5D, a first sensor 7, a second sensor 8, a posture sensor 9, and a controller 10 for overall control.

The driving unit 5D electrically drives each of the moving member 5B and the moving member 5C, and is configured by an actuator such as a solenoid or a motor. The driving unit 5D operates according to a command from the controller 10 to move the moving member 5B and the moving member 5C.

The first sensor 7 is a sensor for detecting the rotation position of the first rotation member 2. The first sensor 7 is configured by, for example, a mechanical switch arranged on the moving path of the rotational member 5A, an acceleration sensor fixed to the rotational member 5A, or the like. Detection information of the first sensor 7 is input to the controller 10.

The second sensor 8 is a sensor for detecting the rotation position of the second rotation member 3. The second sensor 8 is configured by, for example, a mechanical switch arranged on the moving path of the second rotation member 3, an acceleration sensor fixed to the second rotation member 3, or the like. Detection information of the second sensor 8 is input to the controller 10.

The posture sensor 9 is a sensor for detecting whether the installation form of the projector 100 is in the above-described first installation form or the second installation form. The posture sensor 9 is configured by, for example, the acceleration sensor fixed to the housing 1. Detection information of the posture sensor 9 is input to the controller 10.

The controller 10 comprises various processors, a read only memory (ROM), and a random access memory (RAM).

Examples of the various processors include a central processing unit (CPU) which is a general-purpose processor for executing a program and performing various processes, a programmable logic device (PLD) which is a processor capable of changing a circuit configuration after the manufacture such as a field programmable gate array (FPGA), or a dedicated electric circuit which is a processor having a circuit configuration specifically designed for executing a specific process such as an application specific integrated circuit (ASIC).

The structure of these various processors is, more specifically, an electric circuit in which circuit elements such as semiconductor elements are combined.

The processor of the controller 10 may be configured by one of various processors, or may be a combination of two or more processors of the same type or different types (for example, a combination of a plurality of FPGAs or a combination of CPU and FPGA).

Figure 8:
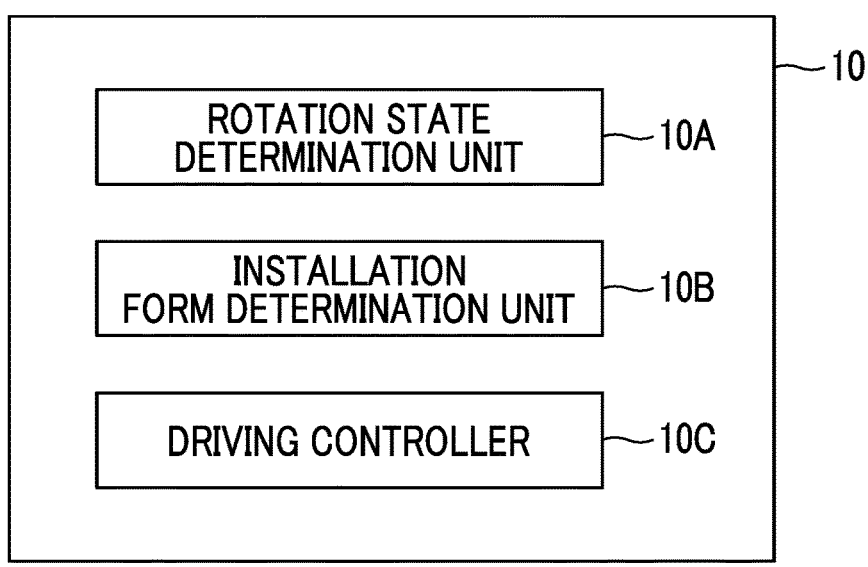
FIG. 8 is a functional block view of a controller 10 shown in FIG. 7.

FIG. 8 is a functional block view of a controller 10 shown in FIG. 7. The processor of the controller 10 functions as a rotation state determination unit 10A, an installation form determination unit 10B, and a driving controller 10C by executing the program.

The installation form determination unit 10B determines whether the projector 100 is the first installation form or the second installation form on the basis of the detection information input from the posture sensor 9.

The rotation state determination unit 10A determines whether or not the first rotation member 2 and the second rotation member 3 are in a predetermined specific rotation state on the basis of detection information input from the first sensor 7 and the second sensor 8.

The specific rotation state is a state in which the optical axis of the lens 35 is directed to the surface Sa side of the housing 1 facing the portion (the placing table, ceiling, or the like of table, and the like) where the housing 1 is installed in the housing 1 by rotating the first rotation member 2 by 90 degree.

For example, a case where the second rotation member 3 is rotated by 90 degree clockwise from the state shown in FIG. 1, and then the first rotation member 2 is rotated by 90 degree clockwise can be considered (in the first installation form, the direction Z1 is opposite to the vertical direction and the third direction is perpendicular to the direction X1 and the direction Z1). In this case, the lens 35 may collide with the placing table on which the housing 1 is installed. As described above, a state immediately before the rotation state in which the lens 35 can collide with an obstacle is defined as the above-described specific rotation state.

It should be noted that assuming that the projector 100 is in the second installation form, even in a case where the second rotation member 3 is rotated by 360 degree while the first rotation member 2 is in each rotational position, the lens 35 does not hit the obstacle. Therefore, the above-described specific rotation state is set in the first installation form.

In a case where the installation form determination unit 10B determines that the installation form is the first installation form and the rotation state determination unit 10A determines that the first rotation member 2 and the second rotation member 3 are in a specific rotation state, the driving controller 10C controls the driving unit 5D to move the moving member 5B and the moving member 5C to the regulation position shown in FIG. 5.

In addition, in a case where the installation form determination unit 10B determines that the installation form is the first installation form and the rotation state determination unit 10A determines that the rotation state is not in a specific rotation state, the driving controller 10C moves the moving member 5B and the moving member 5C to the regulation release position shown in FIG. 6.

In addition, in a case where the installation form determination unit 10B determines that the installation form is the second installation form, the driving controller 10C moves the moving member 5B and the moving member 5C to the regulation release position shown in FIG. 6 without using the determination result of the rotation state determination unit 10A.

According to the projector 100 configured as described above, in a case where the first rotation member 2 and the second rotation member 3 are in a specific rotation state, the moving member 5B and the moving member 5C move to the regulation positions, and the rotation of the first rotation member 2 is regulated. Therefore, it is possible to prevent the first rotation member 2 from being rotated from the specific rotation state and the lens 35 from colliding with an obstacle, and it is possible to prevent the lens 35 from being damaged.

Further, according to the projector 100, in a case where the first rotation member 2 and the second rotation member 3 are not in a specific rotation state, the first rotation member 2 can be freely rotated. Therefore, the projection direction can be freely changed in various directions, and the image can be projected well even in a place where an installation space is tight.

It should be noted that the projector 100 may be usable in the first installation form. In this case, the installation form determination unit 10B is unnecessary. In addition, in this case, the rotation state determination unit 10A may determine whether or not the first rotation member 2 and the second rotation member 3 are in a specific rotation state (a state in which the optical axis of the lens 35 is directed to the surface Sa side of the housing 1 by rotating the first rotation member 2 by 90 degree) on the basis of the detection information input from the first sensor 7 and the second sensor 8. In a case where the rotation state determination unit 10A determines that the first rotation member 2 and the second rotation member 3 are in a specific rotation state, the driving controller 10C may control the driving unit 5D to move the moving member 5B and the moving member 5C to the regulation position shown in FIG. 5, and in a case where the rotation state determination unit 10A determines that the first rotation member 2 and the second rotation member 3 are not in a specific rotation state, the driving controller 10C may control the driving unit 5D to move the moving member 5B and the moving member 5C to the regulation release position shown in FIG. 6.

In the above projector 100, the driving unit 5D functions as a regulation releasing restriction unit. In addition, the regulation mechanism for regulating the rotation of the first rotation member 2 is configured by the moving member 5B, the moving member 5C, and the driving unit 5D.

In the explanation so far, one specific rotation state is set, but a plurality of specific rotation states may be set. For example, in a case where the first rotation member 2 is rotated by 90 degree and there exists a rotation state in which projection of an image cannot be performed well or in which projection of an image is not desired, this rotation state may also be set as a specific rotation state.

In addition, in the above description, the lens 35 is protected by regulating the rotation of the first rotation member 2, but the lens 35 may be protected by regulating the rotation of the second rotation member 3 instead of regulating the rotation of the first rotation member 2. Alternatively, the lens 35 may be protected by regulating the rotation of both the first rotation member 2 and the second rotation member 3.

Figure 9:
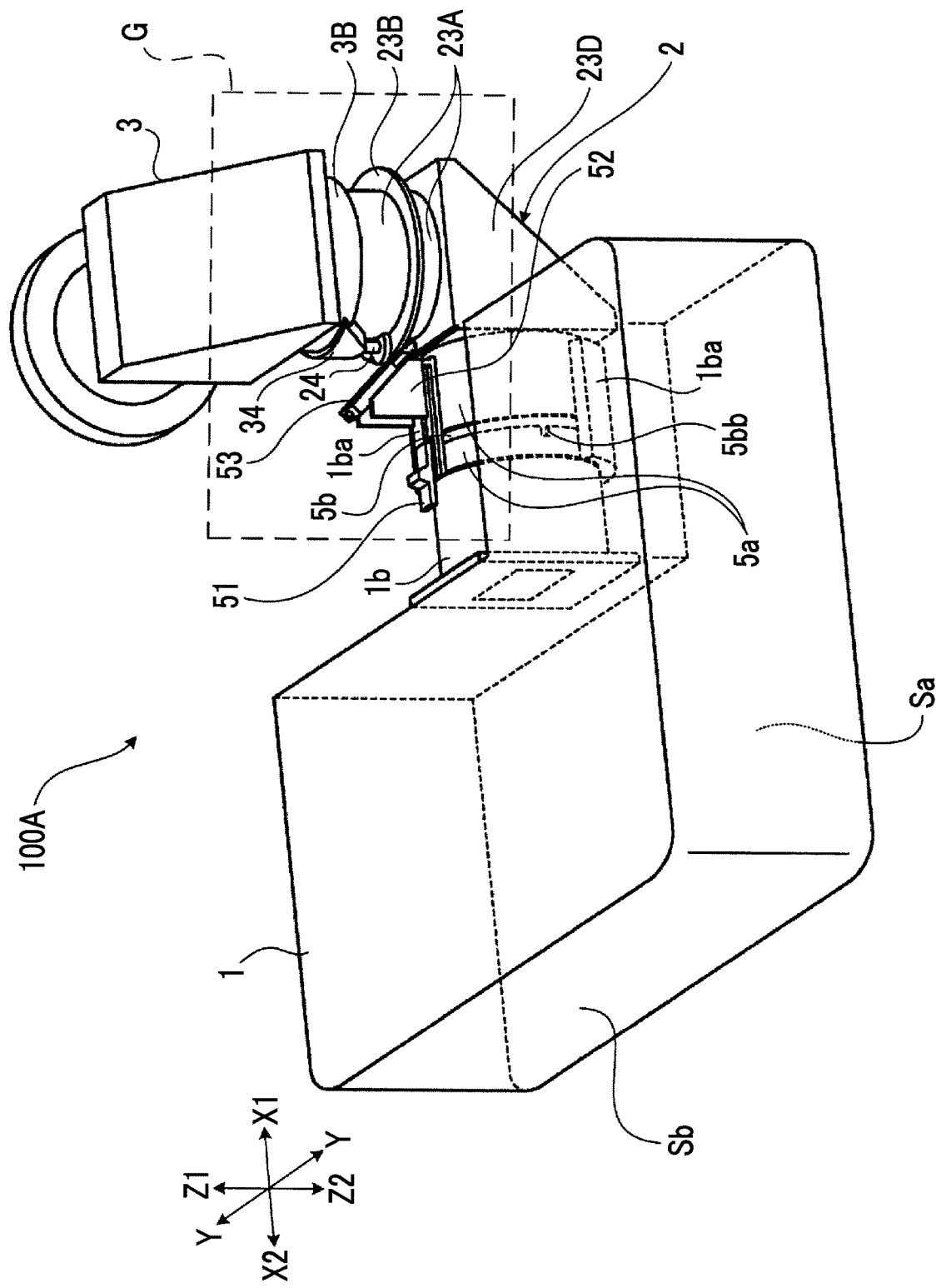
FIG. 9 is a perspective view showing an external configuration of a projector 100A, which is a first modification example of the projector 100 shown in FIG. 1.
Figure 10:
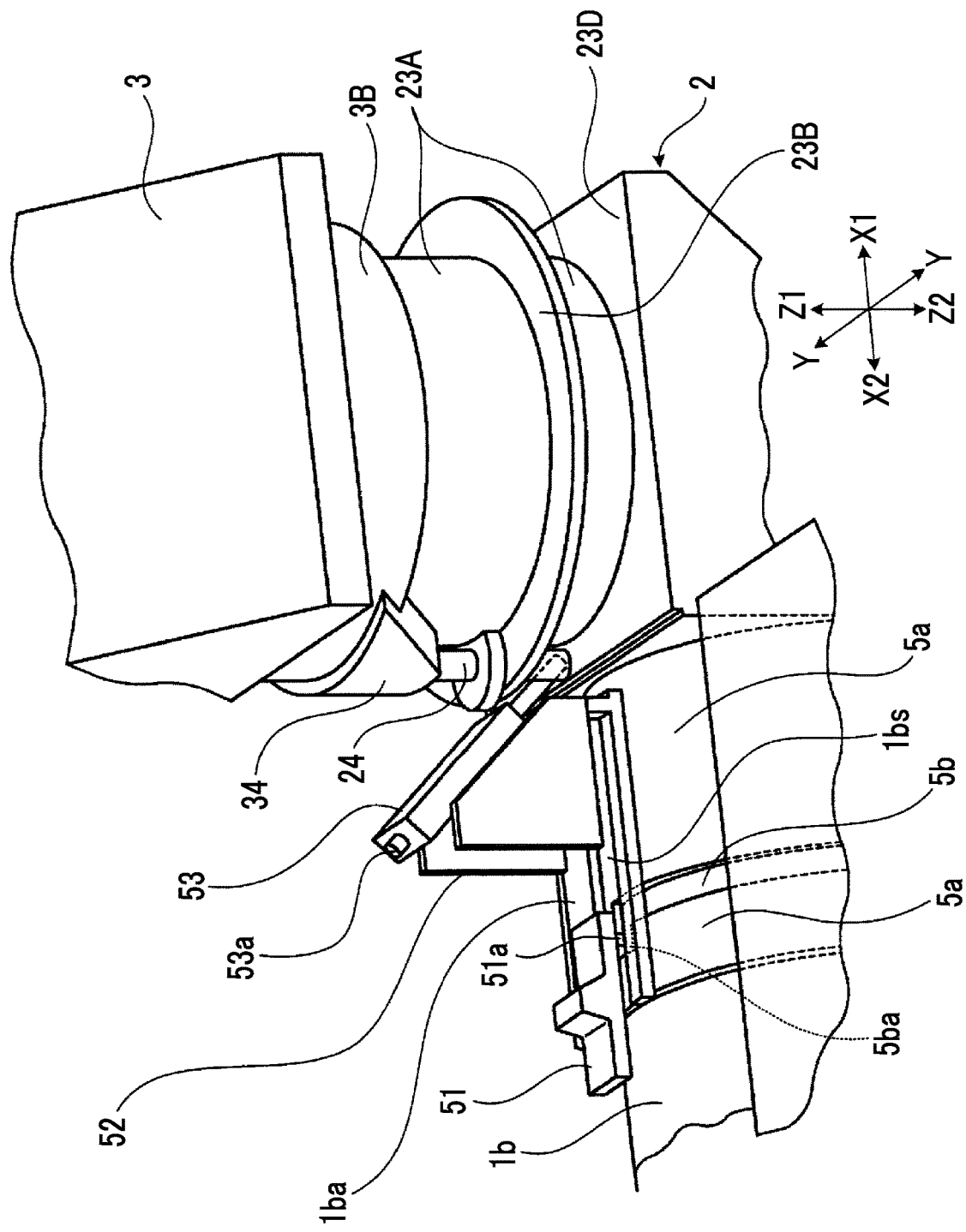
FIG. 10 is an enlarged view of a range G in the projector 100A shown in FIG. 9.
Figure 11:
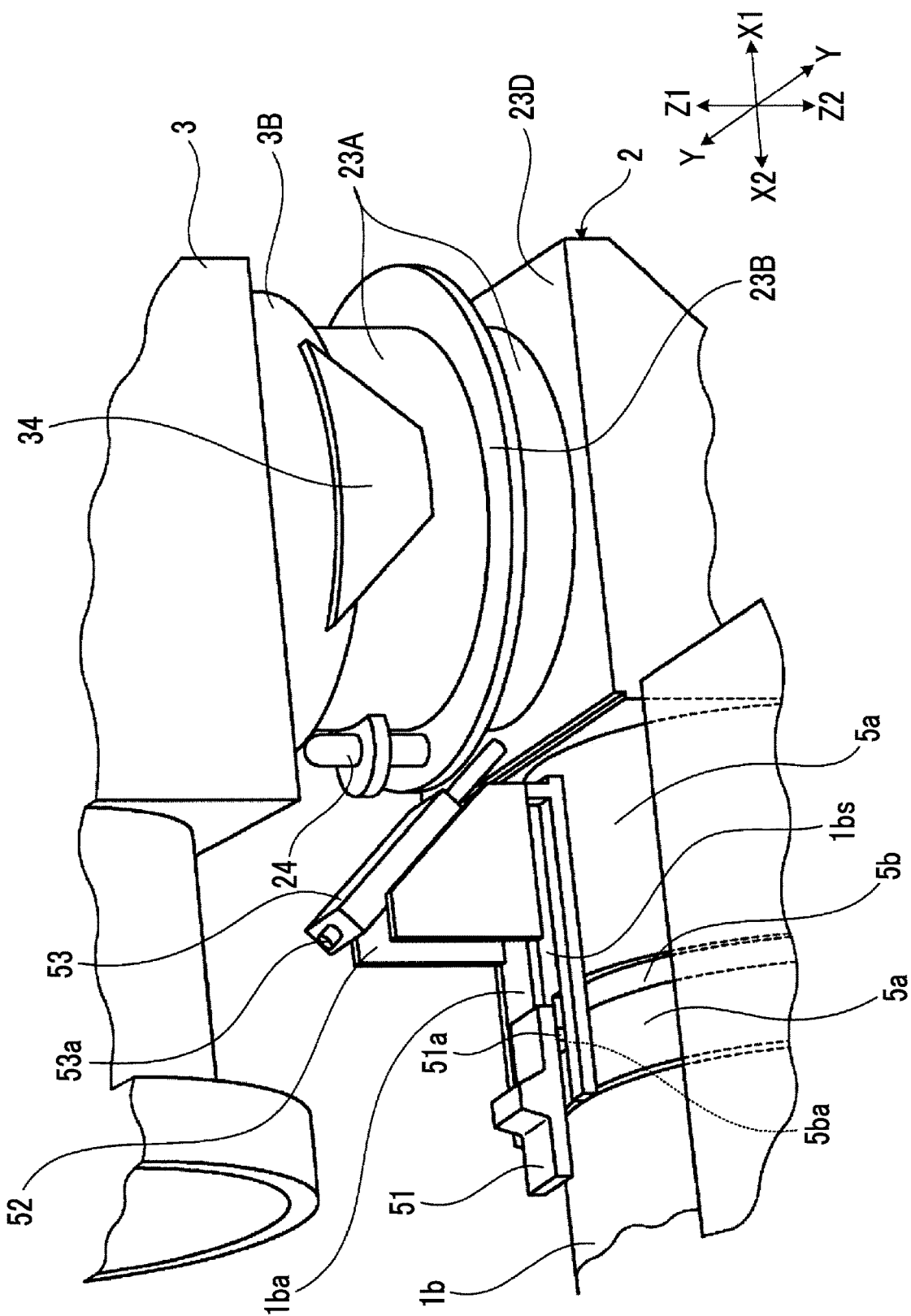
FIG. 11 is a view showing a state in which the second rotation member 3 is rotated by 90 degree counterclockwise in the projector 100A shown in FIG. 10.
Figure 12:
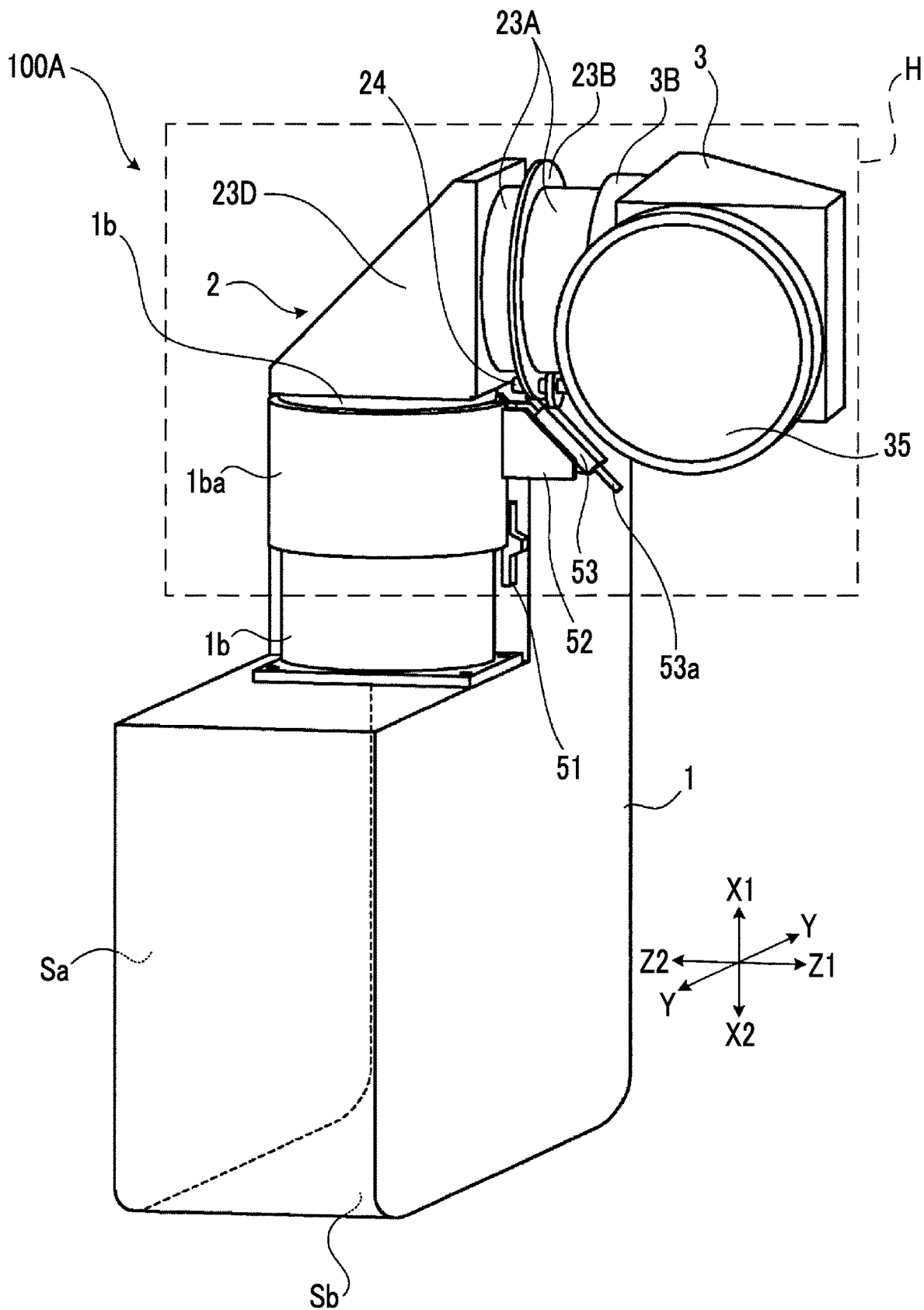
FIG. 12 is an external perspective view showing a second installation form of the projector 100A shown in FIG. 9.
Figure 13:
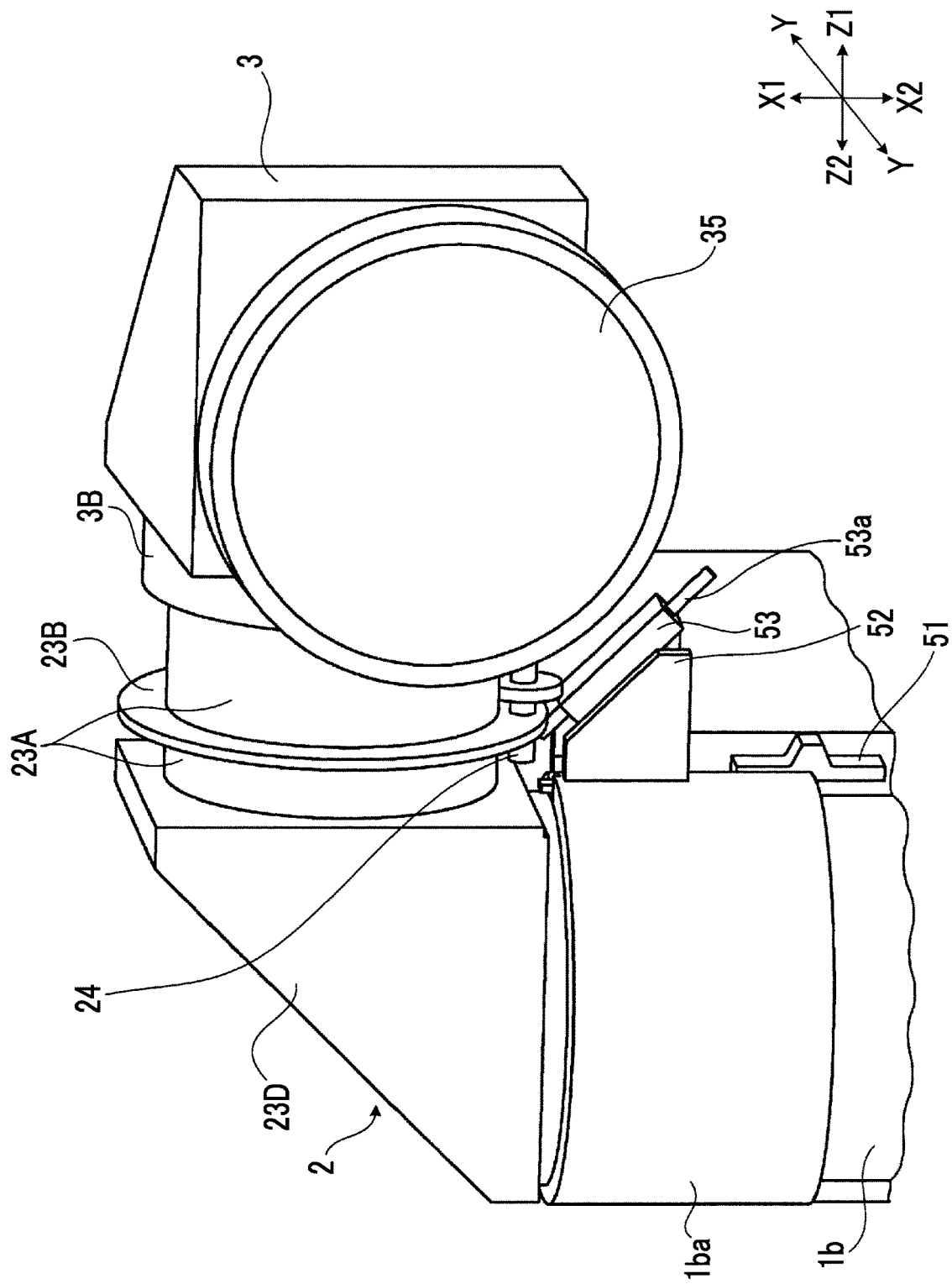
FIG. 13 is an enlarged view of a range H of the projector 100A shown in FIG. 12.
Figure 14:
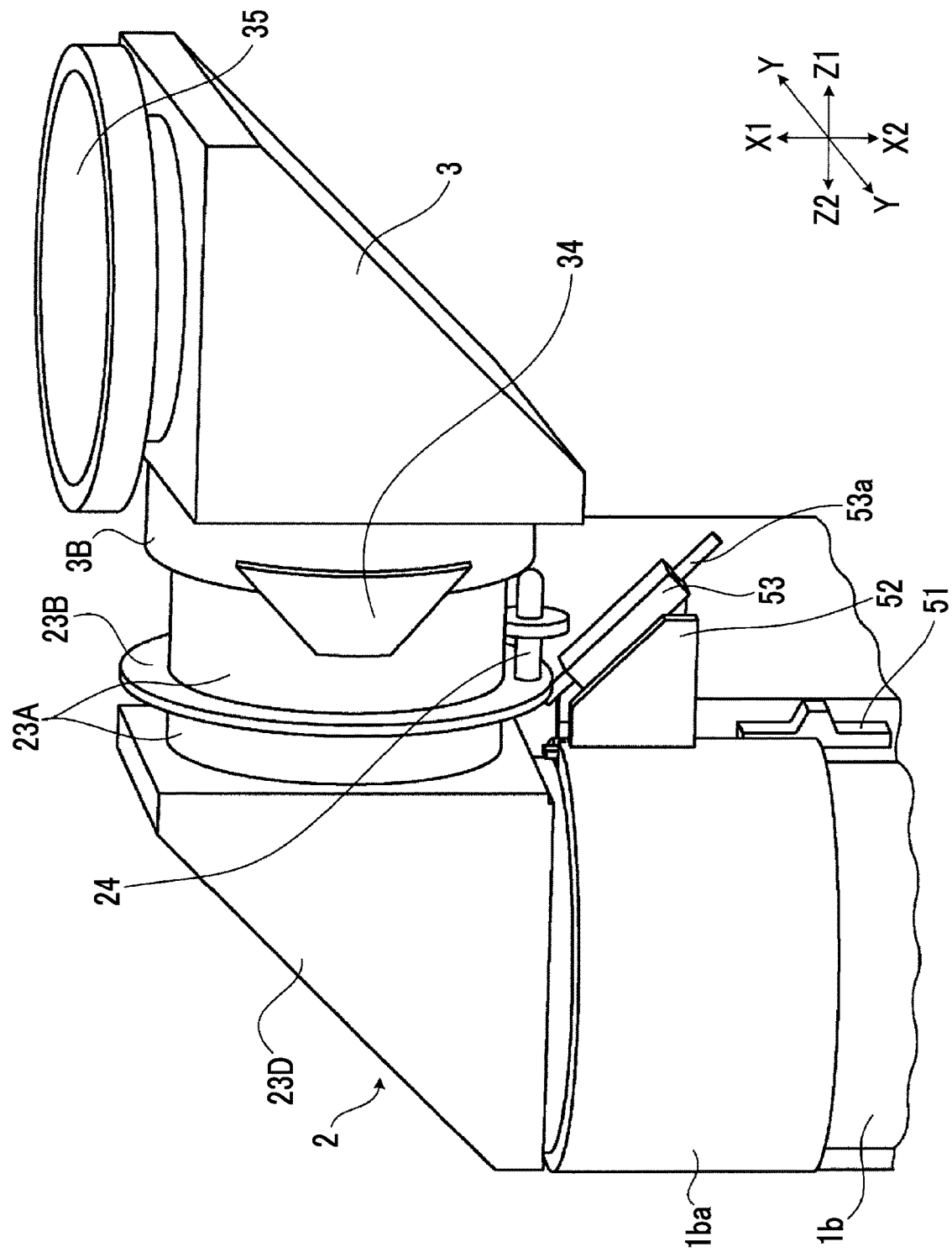
FIG. 14 is a view showing a state in which the second rotation member 3 is rotated by 90 degree to the back side of a paper surface in the projector 100A shown in FIG. 13.

FIG. 9 is a perspective view showing an external configuration of the projector 100A, which is a first modification example of the projector 100 shown in FIG. 1. FIG. 10 is an enlarged view of a range G in the projector 100A shown in FIG. 9. FIG. 11 is a view showing a state in which the second rotation member 3 is rotated by 90 degree counterclockwise in the projector 100A shown in FIG. 10. FIG. 12 is an external perspective view showing a second installation form of the projector 100A shown in FIG. 9. FIG. 13 is an enlarged view of a range H of the projector 100A shown in FIG. 12. FIG. 14 is a view showing a state in which the second rotation member 3 is rotated by 90 degree to the back side of a paper surface in the projector 100A shown in FIG. 13.

The projector 100A shown in FIG. 9 to FIG. 14 has the same configuration as the projector 100 except that the shape of the first rotation member 2 and the shape of the second rotation member 3 are partially changed, the configuration of the rotation mechanism 5 is changed, a supporting member 1ba, a protruding portion 52, and a tubular member 53 are added, and the driving unit 5D, the first sensor 7, the second sensor 8, and the posture sensor 9 are deleted.

The first rotation member 2 of the projector 100A is configured by a main body 23D having a triangular columnar outer shape, and a cylindrical portion 23A located between the main body 23D and the second rotation member 3 and having an annular flange portion 23B.

The supporting member 1ba that covers about ¾ of the outer peripheral surface is fixed to the outer peripheral surface of the end portion of the cylindrical portion 1b of the projector 100A on the first rotation member 2 side. The rotational member 5a that covers about half circumference of the outer peripheral surface is arranged between the supporting member 1ba and the outer peripheral surface of the cylindrical portion 1b. The rotational member 5a is fixed to the end surface of the main body 23D of the first rotation member 2 on the cylindrical portion 1b side, and is supported by the supporting member 1ba in a state that the rotational member 5a is rotatable in the circumferential direction of the cylindrical portion 1b.

As shown in FIG. 10 and FIG. 11, the supporting member 1ba fixed to the cylindrical portion 1b of the projector 100A is formed with a slit 1bs extending in the axis direction (the direction X1) of the cylindrical portion 1b. In addition, the supporting member 1ba supports the slide member 51 in a state of being movable along the inside of the slit 1bs.

Further, the protruding portion 52 projecting outward in the radial direction (the direction Z1 side in FIG. 9) of the cylindrical portion 1b are fixed on both sides of the slit 1bs of the supporting member 1ba. The tubular member 53 is fixed to the protruding portion 52 in a state of intersecting a surface perpendicular to the axis direction of the cylindrical portion 1b and a surface perpendicular to this surface. In the examples of FIG. 9 to FIG. 14, the tubular member 53 has a quadrangular columnar outer shape, and a columnar member 53a (refer to FIG. 10 to FIG. 14) such as a cylinder column or a square column is movably supported in a hollow portion thereof.

In the first installation form (here, however, the direction Z2 is assumed to be the vertical direction) of the projector 100A shown in FIG. 9, the columnar member 53a moves in the hollow portion of the tubular member 53 toward the direction Z2 due to its weight, and a distal end portion on the vertical direction side thereof abuts against the periphery of the cylindrical portion 23A on the surface where the cylindrical portion 23A of the main body 23D is formed.

As shown in FIG. 10 and FIG. 11, a protruding portion 51a extending toward the cylindrical portion 1b is formed on the surface of the slide member 51 on the cylindrical portion 1b side. The slide member 51 is supported by the supporting member 1ba such that the protruding portion 51a can move the inside of the slit 1bs in the direction X1 and direction X2.

As shown in FIG. 9 to FIG. 11, a slit 5b for rotating the rotational member 5a is formed in the rotational member 5a along the circumferential direction of the cylindrical portion 1b. The slit 5b is formed with three convex portions extending in the direction X2 for regulating the rotation of the first rotation member 2 (in FIG. 9 and FIG. 10, a convex portion 5ba and a convex portion 5bb are shown).

In a state where the protruding portion 51a of the slide member 51 is located at the part of the slit 5b except the three convex portions, the first rotation member 2 can be rotated around a rotation axis extending in the direction X1 by 180 degree with respect to the cylindrical portion 1b by the sliding operation of the cylindrical portion 1b exposed from the slit 5b and the protruding portion 51a.

On the other hand, in a case where the protruding portion 51a of the slide member 51 is manually moved into the convex portion 5ba in a state where the first rotation member 2 is in the rotational position by 0 degree, the rotation of the first rotation member 2 can be regulated, but this regulation can be released manually.

Similarly, in a case where the protruding portion 51a of the slide member 51 is manually moved into the convex portion 5bb in a state where the first rotation member 2 is in the rotational position by 90 degree, the rotation of the first rotation member 2 can be regulated, but this regulation can be released manually.

Similarly, in a case where the protruding portion 51a of the slide member 51 is manually moved into the convex portion (not shown) in a state where the first rotation member 2 is in the rotational position by 180 degree, the rotation of the first rotation member 2 can be regulated, but this regulation can be released manually.

A through hole (not shown) is formed in the flange portion 23B of the second rotation member 3 of the projector 100A, and a pin 24, which is a columnar member extending in the direction Z1, is inserted into the through hole.

The pin 24 is biased in the direction Z1 by a spring or the like (not shown). The pin 24 is inserted into the through hole so as to be movable in direction Z1 and direction Z2.

The second rotation member 3 of the projector 100A has an end portion 3B on the first rotation member 2 side formed in a cylindrical shape. A pressing member 34 is provided on a part of the outer peripheral surface of the end portion 3B to press one end of the pin 24 protruding toward the second rotation member 3 from the flange portion 23B with respect to the direction Z2 in a case where the second rotation member 3 is in the rotational position shown in FIG. 9. The pressing member 34 is formed so as not to come into contact with the pin 24 in a case where the second rotation member 3 is in a rotational position other than the rotational position shown in FIG. 9.

As shown in FIG. 10, in a case where one end of the pin 24 is pressed by the pressing member 34, the other end of the pin 24 on the side of the main body 23D as viewed from the direction Y perpendicular to the direction X1 and the direction Z1 overlaps with the end portion of the columnar member 53a protruding from the hollow portion of the tubular member 53, and these end portions abut with each other.

In the state shown in FIG. 10, the other end of the pin 24 is positioned closer to the front side of the paper surface than the end portion of the columnar member 53a. Therefore, even in a case where the protruding portion 51a of the slide member 51 is moved from the state of being in the convex portion 5ba to the outside of the convex portion 5ba, the first rotation member 2 cannot rotate due to the abutment between the pin 24 supported by the first rotation member 2 and the columnar member 53a. As a result, the rotation of the first rotation member 2 in the above-described specific rotation state is regulated.

In addition, in the projector 100A, even in a case where the pressing member 34 comes into contact with the pin 24, the other end of the pin 24 does not abut against the columnar member 53a in a case where the first rotation member 2 is in the rotational position by 90 degree and the rotational position by 180 degree in the first installation form. In addition, in a case where the first rotation member 2 is in the rotational position by 0 degree in the first installation form, the first rotation member 2 can be rotated as long as the pressing member 34 does not contact the pin 24. As described above, in the rotation state other than the specific rotation state shown in FIG. 9, the first rotation member 2 and the second rotation member 3 can be freely rotated without any regulation.

In the second installation form (the installation form in which the direction X2 is the vertical direction), the projector 100A is in a state in which the columnar member 53a is moved to the direction X2 side by its weight, as shown in FIG. 12 to FIG. 14. In either of a state in which one end of the pin 24 is pressed by the pressing member 34 (FIG. 13) and a state in which one end of the pin 24 is not pressed by the pressing member 34 (FIG. 14), the other end of the pin 24 on the main body 23D side and the end portion of the columnar member 53a do not overlap as viewed from the direction Y. Therefore, in the second installation form, the projector 100A can freely rotate each of the first rotation member 2 and the second rotation member 3 without any regulations.

In the projector 100A described above, the pin 24 is configured with a moving member, and the position of the pin 24 in a state where the pin 24 is pressed by the pressing member 34 becomes a regulation position for regulating the rotation of the first rotation member 2. In addition, the columnar member 53a is configured with the abutting member. In addition, the pressing member 34 is configured with a regulation releasing restriction unit that fixes the pin 24 at the regulation position in a case where the first rotation member 2 and the second rotation member 3 are in the specific rotation state. Further, the pin 24 and the pressing member 34 are configured with a regulation mechanism for regulating the rotation of the first rotation member 2.

According to the projector 100A, the rotation of the first rotation member 2 can be regulated in the specific rotation state in the first installation form without requiring electric driving. Therefore, it is possible to reduce the size, weight, and cost of the projector 100A.

In addition, according to the projector 100A, in the case of the second installation form, or in the case where the first rotation member 2 and the second rotation member 3 are not in a specific rotation state even in the first installation form, the first rotation member 2 can be freely rotated. Therefore, the projection direction can be freely changed in various directions, and the image can be projected well even in a place where an installation space is tight.

It should be noted that the projector 100A may be usable in the first installation form. In this case, the columnar member 53a may be fixed to the hollow portion of the tubular member 53 at the positions shown in FIG. 9 and FIG. 10.

Figure 15:
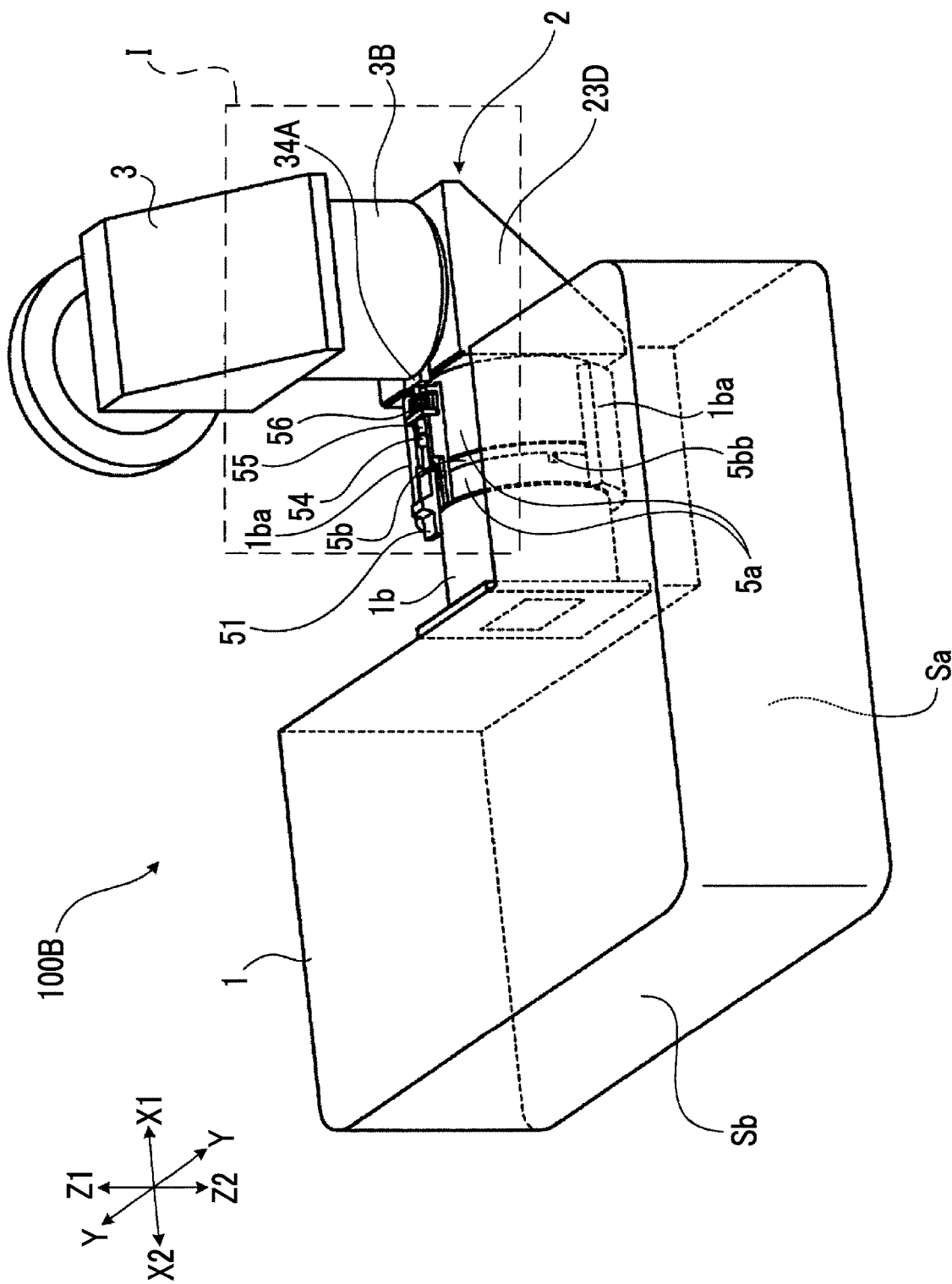
FIG. 15 is a perspective view showing an external configuration of a projector 100B, which is a second modification example of the projector 100 shown in FIG. 1.
Figure 16:
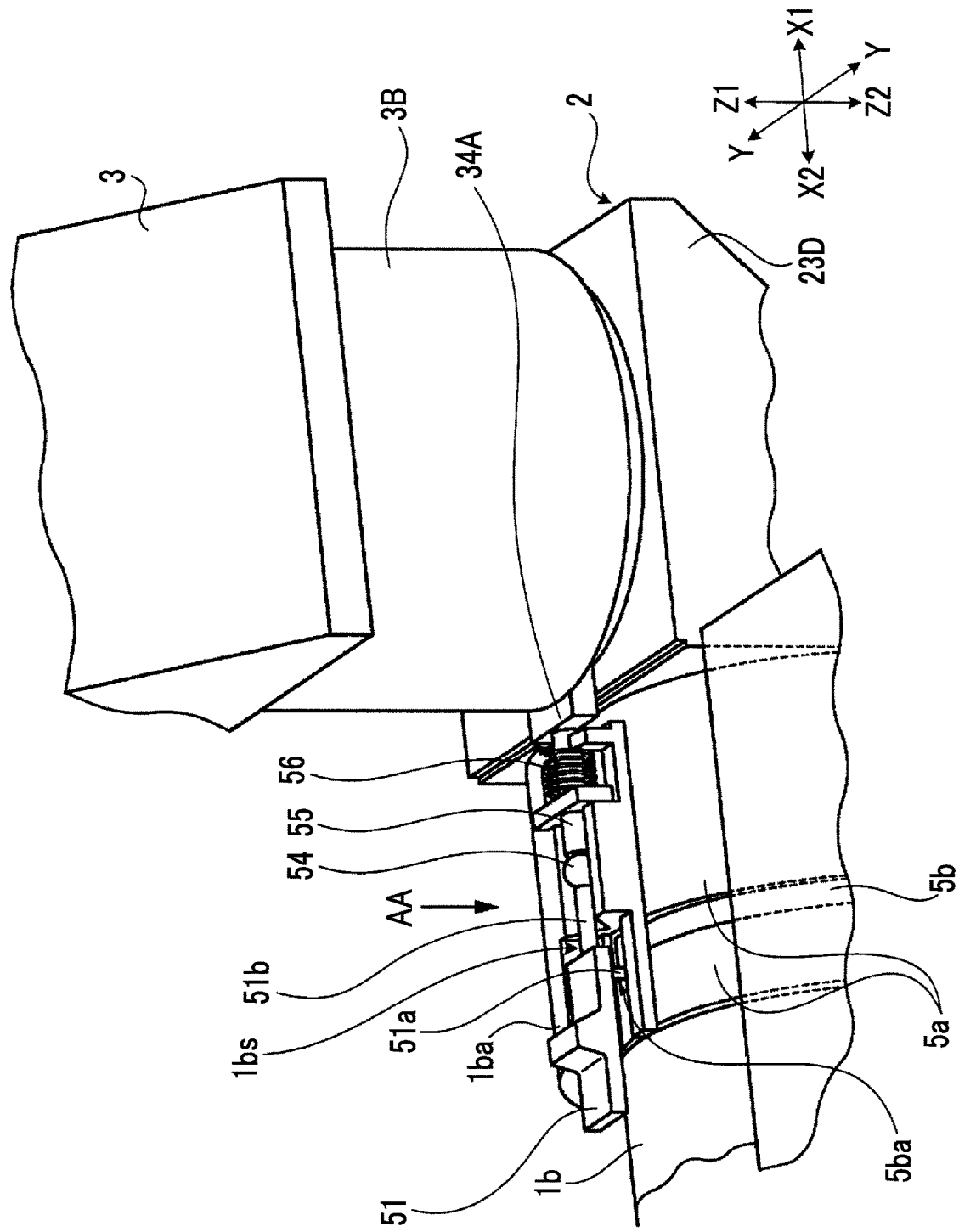
FIG. 16 is an enlarged view of a range I in the projector 100B shown in FIG. 15.
Figure 17:
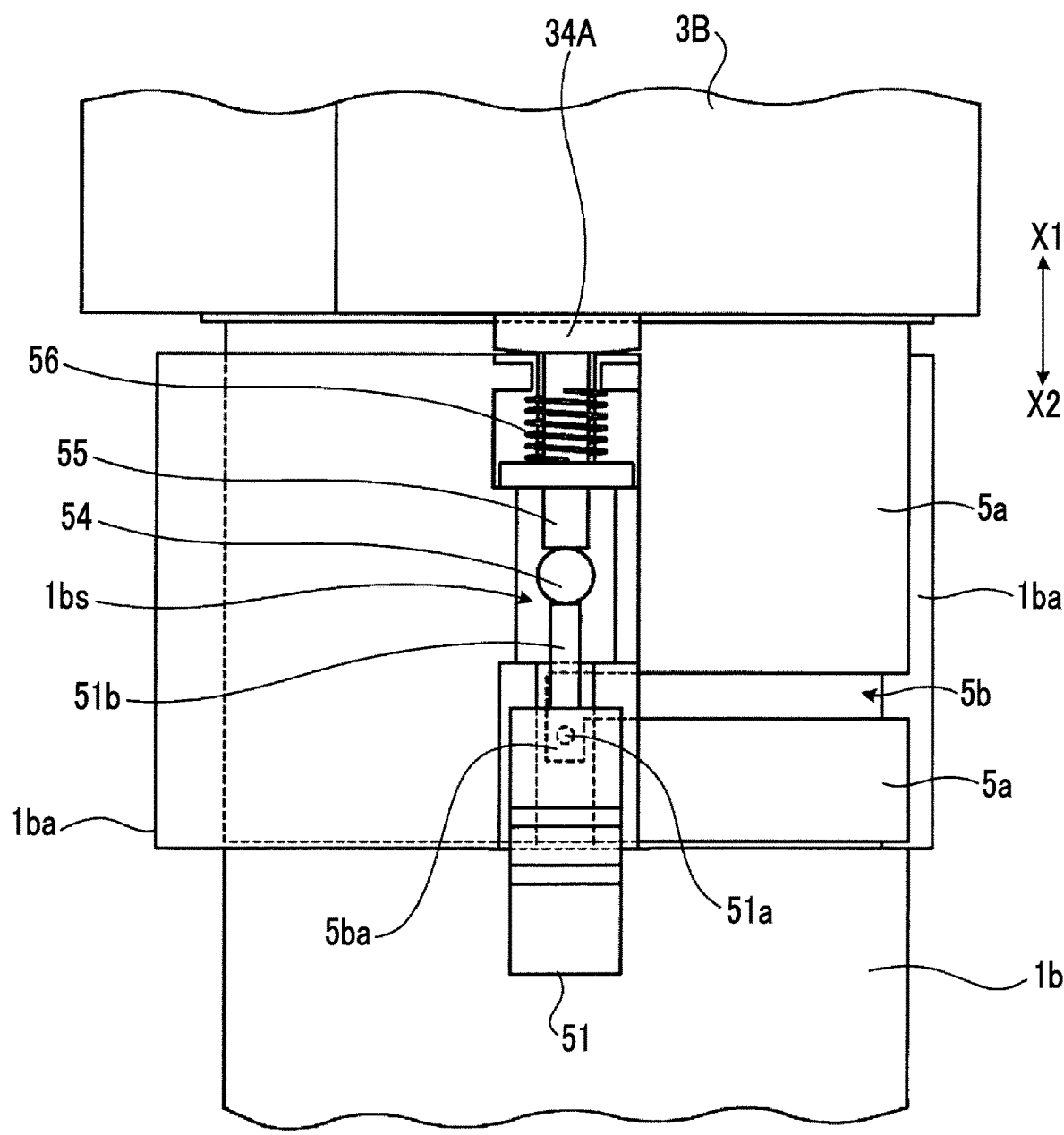
FIG. 17 is a schematic plan view seen from a direction AA shown in FIG. 16.
Figure 18:
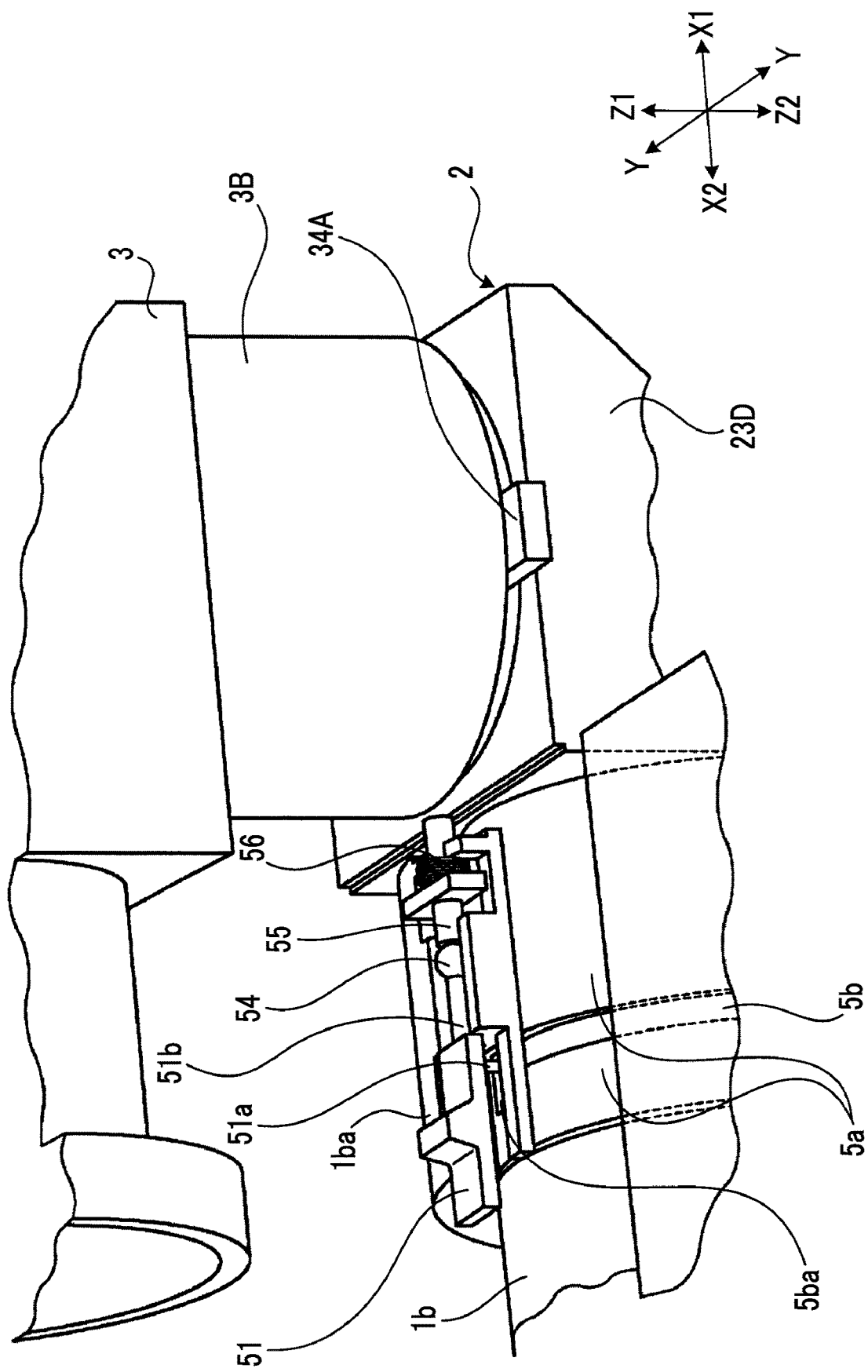
FIG. 18 is a view showing a state in which the second rotation member 3 is rotated by 90 degree counterclockwise in the projector 100B shown in FIG. 16.
Figure 19:
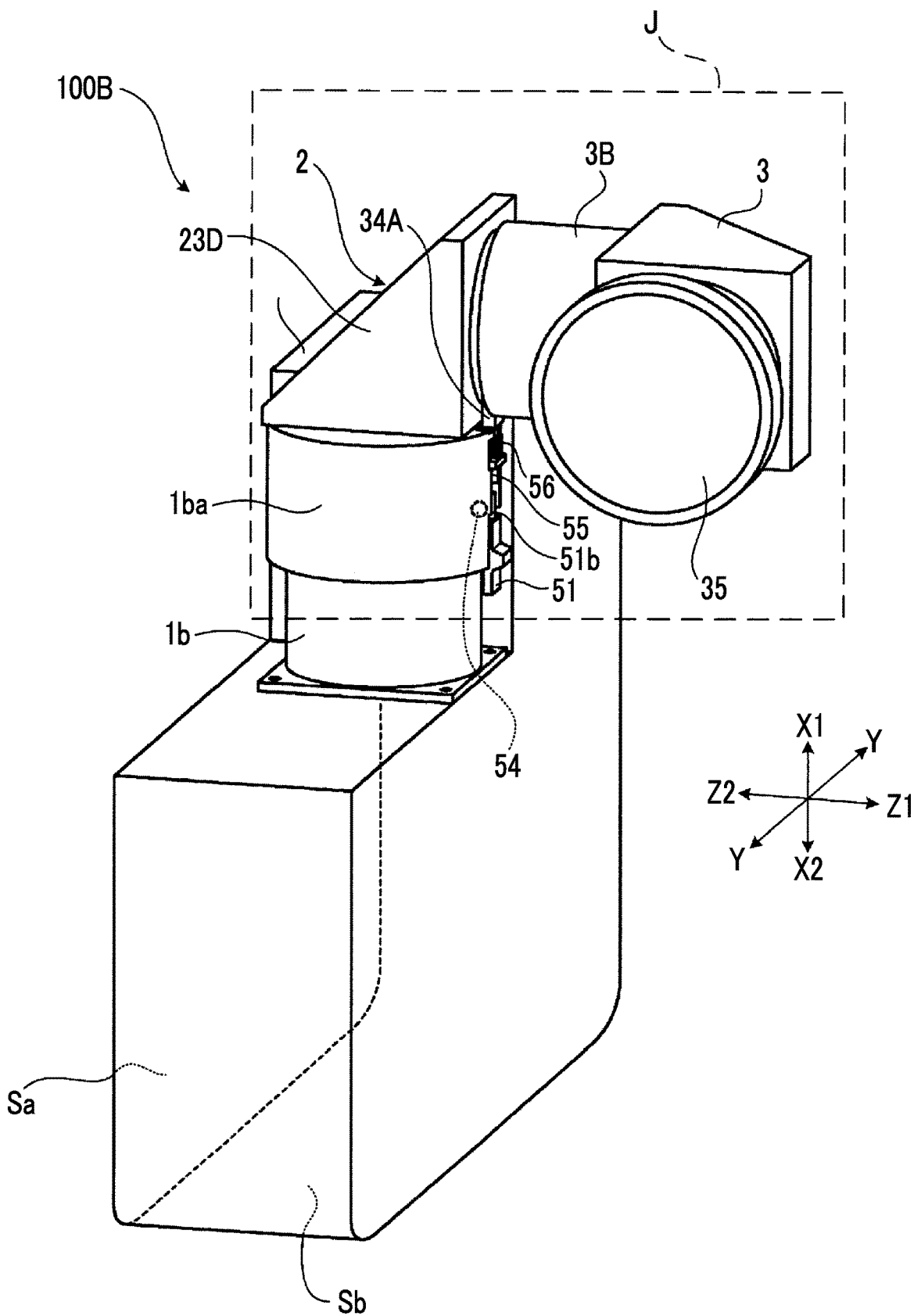
FIG. 19 is an external perspective view showing a second installation form of the projector 100B shown in FIG. 15.
Figure 20:
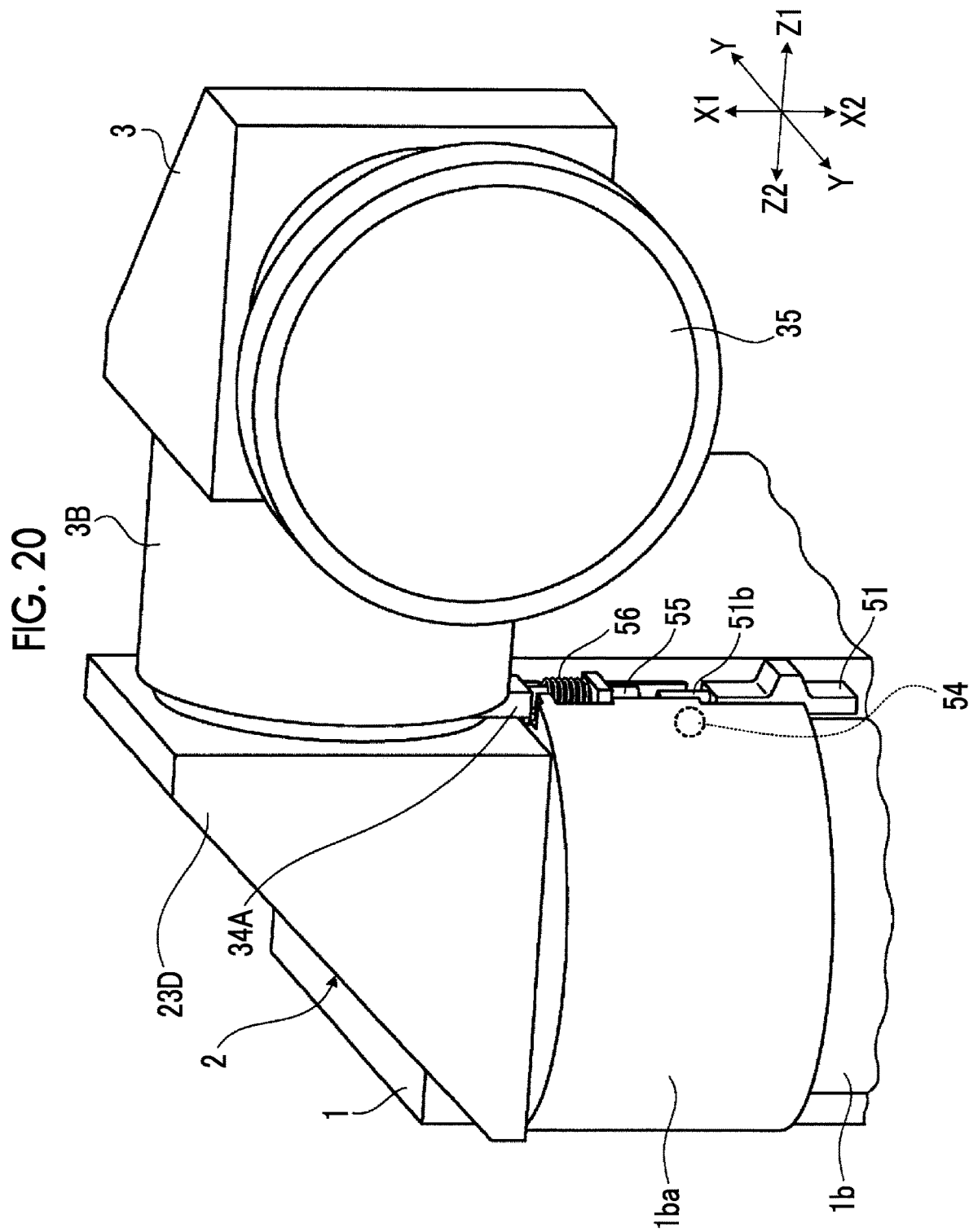
FIG. 20 is an enlarged view of a range J of the projector 100B shown in FIG. 19.
Figure 21:
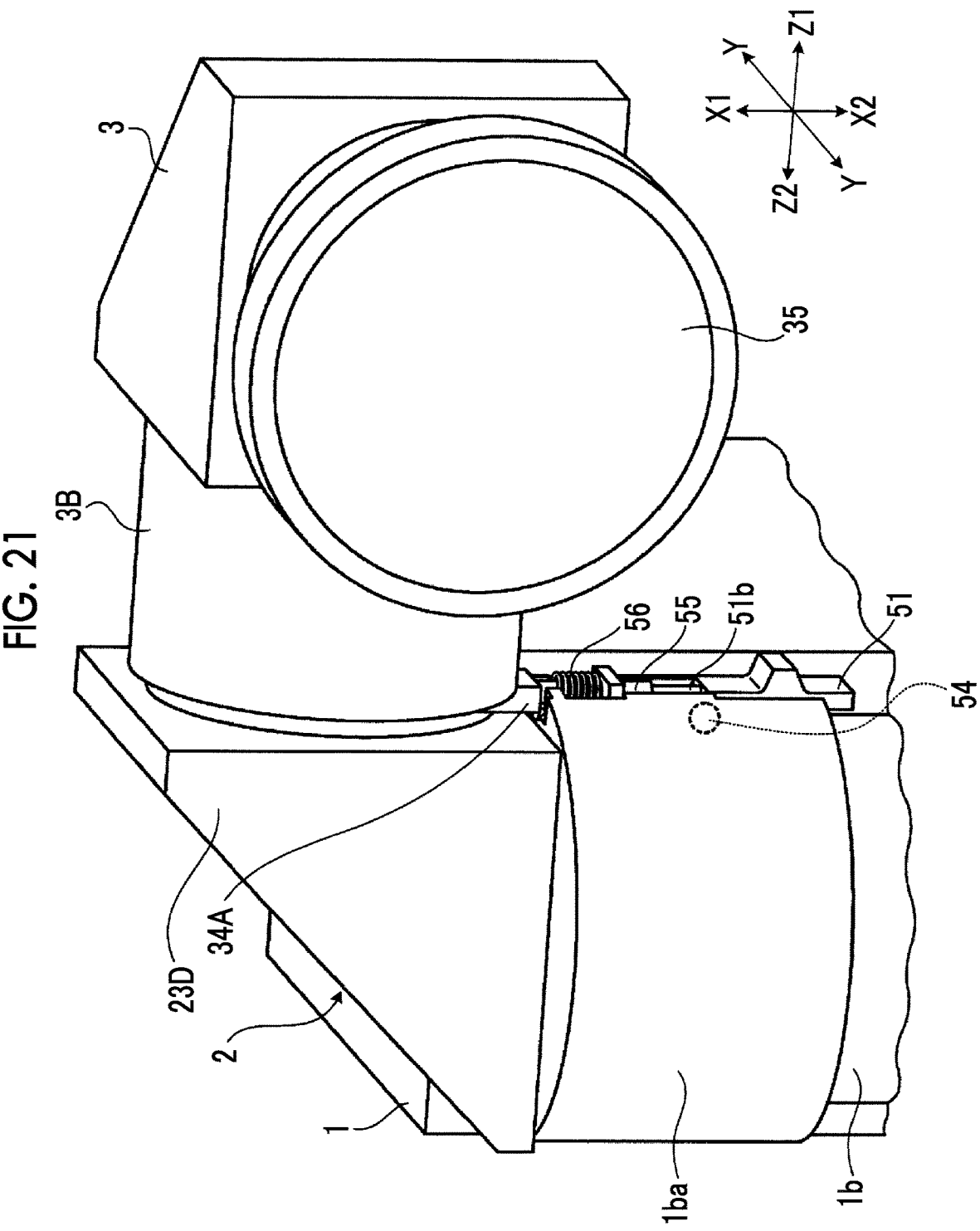
FIG. 21 is a view showing a state in which a slide member 51 is moved to a regulation release position in the projector 100B shown in FIG. 20.

FIG. 15 is a perspective view showing an external configuration of a projector 100B, which is a second modification example of the projector 100 shown in FIG. 1. FIG. 16 is an enlarged view of a range I in the projector 100B shown in FIG. 15. FIG. 17 is a schematic plan view seen from a direction AA shown in FIG. 16. FIG. 18 is a view showing a state in which the second rotation member 3 is rotated by 90 degree counterclockwise in the projector 100B shown in FIG. 16. FIG. 19 is an external perspective view showing a second installation form of the projector 100B shown in FIG. 15. FIG. 20 is an enlarged view of a range J of the projector 100B shown in FIG. 19. FIG. 21 is a view showing a state in which a slide member 51 is moved to a regulation release position in the projector 100B shown in FIG. 20.

In the projector 100B shown in FIG. 15 to FIG. 21, the flange portion 23B, the pin 24, and the pressing member 34 are deleted from the projector 100A, and the cylindrical portion 23A of the first rotation member 2 is arranged on the inner peripheral side of the end portion 3B of the second rotation member 3. In addition, in the projector 100B, the tubular member 53 and the protruding portion 52 are deleted in the projector 100A, and the shape of the slit 1bs formed in the supporting member 1ba is changed. Further, the configuration of the members arranged in the slit 1bs has been changed with respect to the projector 100A.

At the end portion of the end portion 3B of the second rotation member 3 in the projector 100B on the first rotation member 2 side, a pressing member 34A is provided at a position facing the slit 1bs in the specific rotation state shown in FIG. 15.

As shown in FIG. 17, in the projector 100B, a rod-shaped member 51b extending in the direction X1 is added to the distal end of the slide member 51 movably arranged in the slit 1bs on the direction X1 side. In addition, in the slit 1bs, a rolling element 54 is arranged next to the slide member 51 on the direction X1 side. Further, in the slit 1bs, a flanged and cylindrical pressed member 55 which is directly pressed by the pressing member 34A of the second rotation member 3 in a specific rotation state shown in FIG. 15 is formed next to the rolling element 54 on the direction X1 side.

The pressed member 55 is biased toward the direction X1 by a spring 56. Therefore, in a state where the pressed member 55 is not pressed in the direction X2 by the pressing member 34A (refer to FIG. 18), the pressed member 55 moves to the direction X1 side from the state in FIG. 17, and a gap is generated between the pressed member 55 and the rolling element 54. Therefore, in this state, as shown in FIG. 18, the slide member 51 can be moved in the direction X1 to move from the regulation position (in the convex portion 5ba) for regulating the rotation of the first rotation member 2 to the regulation release position (the position on the direction X1 side of the convex portion 5ba) for releasing the regulation on the rotation of the first rotation member 2.

On the other hand, in the state of FIG. 16 in which the pressed member 55 is pressed in the direction X2 by the pressing member 34A, the slide member 51 is configured such that the protruding portion 51a cannot move from the state where the protruding portion 51a is in the convex portion 5ba. Therefore, in this state, the slide member 51 is fixed at the regulation position (in the convex portion 5ba) that regulates the rotation of the first rotation member 2, and the regulation cannot be released.

It should be noted that in the second installation form shown in FIG. 19, the supporting member 1ba is formed with a retracting hole (not shown) for retracting the rolling element 54 between the pressed member 55 and the slide member 51 from between them. In the first installation form, the rolling element 54 is inserted between the pressed member 55 and the slide member 51 through the retracting hole, and in the second installation form, the rolling element 54 is retracted from between the pressed member 55 and the slide member 51 into the retracting hole.

Therefore, in the second installation form, as shown in FIG. 20 and FIG. 21, even in a case where the pressing member 34A of the second rotation member 3 presses the pressed member 55, the slide member 51 can move between the regulation position and the regulation release position as much as the rolling element 54 is retracted.

As described above, according to the projector 100B, in the specific rotation state in the first installation form, the slide member 51 is fixed to the regulation position, and the release of the regulation of the rotation of the first rotation member 2 is restricted. Therefore, it is possible to prevent the first rotation member 2 from being rotated by 90 degree toward the back side of the paper surface from the state of FIG. 15 and the lens 35 from colliding with the installation part of the housing 1.

In addition, according to the projector 100B, in the second installation form, the rotation of the first rotation member 2 can be freely regulated by the slide member 51, and the regulation can be freely released. Therefore, the projection direction of the image can be changed to various directions, and the projection direction can be easily fixed by moving the slide member 51 to the regulation position.

In the projector 100B, the pressed member 55 is configured with a first member that is directly pressed by the pressing member 34A. The rolling element 54 is configured with a second member for transmitting the pressing force applied to the pressed member 55 from the pressing member 34A to the slide member 51. The slide member 51 is configured with a third member for regulating the rotation of the first rotation member 2. In addition, the pressed member 55, the rolling element 54, and the slide member 51 are configured with a moving member that is movable in the direction X1 and direction X2 and is supported by the cylindrical portion 1b. Further, the pressing member 34A is configured with a regulation releasing restriction unit.

As described above, the following items are disclosed in the specification.

(1)

A projection apparatus having a light modulation element that spatially modulates light on the basis of image data, and projecting the spatially modulated light onto a projection surface, the projection apparatus comprising:

a main body;

an optical unit that is rotatably supported by the main body and includes a projection optical system for projecting the spatially modulated light onto the projection surface, the optical unit including a first rotation member rotatably supported to the main body, and a second rotation member rotatably supported to the first rotation member; and a regulation mechanism that regulates at least one of rotation of the first rotation member or rotation of the second rotation member, in which the regulation mechanism includes a moving member that is movable between a regulation position for regulating the rotation and a regulation release position for releasing regulation of the rotation, and a regulation releasing restriction unit that fixes the moving member at the regulation position in a case where the first rotation member and the second rotation member are in a predetermined specific rotation state.

(2)

The projection apparatus according to (1), in which an optical member of the projection optical system is provided at an end portion of the second rotation member on the projection surface side, and the specific rotation state is a state in which the optical member is directed to a surface side of the main body facing a portion where the main body is installed by rotating the first rotation member.

(3)

The projection apparatus according to (1) or (2), in which a rotation axis of the first rotation member and a rotation axis of the second rotation member are orthogonal to each other.

According to the configuration, since the projection direction can be changed in various ways, the possibility that the optical member on the projection surface side hits an obstacle increases. Therefore, the effect of preventing damage to the optical member can be remarkably obtained.

(4)

The projection apparatus according to any one of (1) to (3), in which the first rotation member includes a first reflecting member that reflects light emitted from the main body and advancing in a first direction in a second direction perpendicular to the first direction, and is supported by the main body in a state in which the first rotation member is rotatable around a rotation axis extending in the first direction, the second rotation member includes a second reflecting member that reflects light reflected by the first reflecting member and advancing in the second direction, in a third direction perpendicular to the second direction, and is supported by the first rotation member in a state in which the second rotation member is rotatable around a rotation axis extending in the second direction, the moving member is movable between the regulation position for regulating the rotation of the first rotation member and the regulation release position for releasing the regulation of the rotation of the first rotation member, and the specific rotation state is a state in which the second direction is opposite to a vertical direction and the third direction is perpendicular to the first direction and the second direction in a first installation form of the main body in which the first direction is perpendicular to the vertical direction.

(5)

The projection apparatus according to (4), further comprising:

a driving unit that electrically drives the moving member;

a first sensor that detects a rotation position of the first rotation member;

a second sensor that detects a rotation position of the second rotation member; and a rotation state determination unit that determines whether or not it is in the specific rotation state on the basis of detection information of the first sensor and the second sensor, in which the driving unit moves the moving member to the regulation position in a case where it is determined that the specific rotation state is made, and moves the moving member to the regulation release position in a case where it is determined that the specific rotation state is not made, and the regulation releasing restriction unit is configured by the driving unit.

(6)

The projection apparatus according to (5), further comprising:

a posture sensor that detects a posture of the main body; and an installation form determination unit that determines whether an installation form of the main body is the first installation form or a second installation form in which the first direction is opposite to the vertical direction on the basis of detection information of the posture sensor, in which the driving unit moves the moving member to the regulation release position in a case where it is determined that the installation form of the main body is the second installation form.

(7)

The projection apparatus according to (4), in which the moving member is a columnar member which is movable in the second direction and a direction opposite to the second direction, and is supported by the first rotation member, the second rotation member has a pressing member for pressing one end of the moving member in the opposite direction of the second direction in the specific rotation state to move the moving member to the regulation position, the projection apparatus further comprises an abutting member supported by the main body, which abuts against the moving member in the first installation form and in a state in which the moving member is in the regulation position, the rotation of the first rotation member is regulated by a contact between the abutting member and the moving member, and the regulation releasing restriction unit is configured by the pressing member.

(8)

The projection apparatus according to (7), further comprising:

a tubular member that is fixed to the main body, in which the abutting member is a member that is inserted into a hollow portion of the tubular member and is movable in the hollow portion, and the member is in a state of being moved to a position where the member overlaps a moving path of the one end of the moving member as viewed from a direction perpendicular to the first direction and the second direction in the first installation form of the main body, and moved to a position where the member does not overlap the moving path in a second installation form of the main body in which the first direction is opposite to the vertical direction.

(9)

The projection apparatus according to (4), in which the moving member is a member which is movable in the first direction and a direction opposite to the first direction, and is supported by the main body, the second rotation member has a pressing member for pressing one end of the moving member in the opposite direction of the first direction in the specific rotation state to move the moving member to the regulation position, a movement of the moving member in the first direction is restricted by the pressing member in a state in which the moving member is pressed by the pressing member, and the regulation releasing restriction unit is configured by the pressing member.

(10)

The projection apparatus according to (9), in which the moving member is configured by a first member, a second member, and a third member, the first member is a member that is directly pressed by the pressing member in the specific rotation state, the second member is a member for transmitting a pressing force applied to the first member in the specific rotation state to the third member, the third member is a member having a protruding portion for regulating the rotation of the first rotation member, the second member is inserted between the first member and the third member in the first installation form, and the second member is retracted from between the first member and the third member in a second installation form of the main body in which the first direction is opposite to the vertical direction.

Although various embodiments have been described above with reference to the drawings, it goes without saying that the present invention is not limited to such examples. It is obvious to those skilled in the art that various change examples or correction examples can be conceived within the scope described in the claims, and naturally, these also belong to the technical scope of the present invention. In addition, the constituent elements in the above-described embodiments may be randomly combined without departing from the spirit of the invention.

It should be noted that this application is on the basis of JP2018-141573 filed on Jul. 27, 2018, the contents of which are incorporated herein by reference.

According to the present invention, it is possible to provide a projection apparatus capable of changing the projection direction in various ways and preventing damage to the projection optical system.

EXPLANATION OF REFERENCES

100, 100A, 100B: projector
1: housing
Sa, Sb: surface
1A: tubular member
1a: flange portion
1b: cylindrical portion
1k: aperture
1c: protrusion
2: first rotation member
2a, 2b: aperture
2A: hollow portion
21: first optical system
22: first reflecting member
3: second rotation member
3a, 3b: aperture
3A: hollow portion
31: second optical system
32: second reflecting member
33: third optical system
35: lens
4, 5: rotation mechanism
5A: rotational member
5T, 5Ba, 5Ca: groove portion
5B, 5C: moving member
5D: driving unit
6: optical unit
11: light source unit
41r: R light source
41g: G light source
41b: B light source
42r, 42g, 42b: collimator lens
43: dichroic prism
12: light modulation unit
12a: light modulation element
7: first sensor
8: second sensor
9: posture sensor
10: controller
10A: rotation state determination unit
10B: installation form determination unit
10C: driving controller G, H, I, J: range
3B: end portion
23A: cylindrical portion
23B: flange portion
23D: main body
24: pin
34: pressing member
1ba: supporting member
1bs: slit
5a: rotational member
5b: slit
5ba, 5bb: convex portion
51: slide member
51a: protruding portion
52: protruding portion
53: tubular member
53a: columnar member
51b: rod-shaped member
54: rolling element
55: pressed member
56: spring
34A: pressing member

What is claimed is:

1. A projection apparatus having a light modulation element that spatially modulates light based on image data, and projecting the spatially modulated light onto a projection surface, the projection apparatus comprising:

a main body;

an optical unit that is rotatably supported by the main body and includes a projection optical system for projecting the spatially modulated light onto the projection surface, a first rotation member rotatably supported to the main body and a second rotation member rotatably supported to the first rotation member;

a first sensor that detects a rotation position of the first rotation member;

a second sensor that detects a rotation position of the second rotation member;

a controller that determines whether the first rotation member and the second rotation member are in a predetermined specific rotation state or not based on detection information of the first sensor and the second sensor; and a regulation mechanism that regulates at least one of rotation of the first rotation member or rotation of the second rotation member, wherein the regulation mechanism includes a moving member that is movable between a regulation position for regulating the rotation and a regulation release position for releasing the regulating of the rotation, and fixes the moving member at the regulation position in a case where the controller determines that the first rotation member and the second rotation member are in the predetermined specific rotation state, and the moving member is electrically driven.

2. The projection apparatus according to claim 1, wherein an optical member of the projection optical system is provided at an end portion of the second rotation member on the projection surface side, and the specific rotation state is a state in which the optical member is directed to a surface side of the main body facing a portion where the main body is installed by rotating the first rotation member.

3. The projection apparatus according to claim 1, wherein a rotation axis of the first rotation member and a rotation axis of the second rotation member are orthogonal to each other.

4. The projection apparatus according to claim 2,
wherein a rotation axis of the first rotation member and a rotation axis of the second rotation member are orthogonal to each other.

5. The projection apparatus according to claim 1,
wherein the first rotation member includes a first reflecting member that reflects light emitted from the main body and advancing in a first direction in a second direction perpendicular to the first direction, and is rotatable around a rotation axis extending in the first direction,
the second rotation member includes a second reflecting member that reflects light reflected by the first reflecting member and advancing in the second direction, in a third direction perpendicular to the second direction, and is connected by the first rotation member in a state in which the second rotation member is rotatable around a rotation axis extending in the second direction,
the moving member is movable between the regulation position for regulating the rotation of the first rotation member and the regulation release position for releasing the regulating of the rotation of the first rotation member, and
the specific rotation state is a state in which the second direction is opposite to a vertical direction and the third direction is perpendicular to the first direction and the second direction in a first installation form of the main body in which the first direction is perpendicular to the vertical direction.

6. The projection apparatus according to claim 2,
wherein the first rotation member includes a first reflecting member that reflects light emitted from the main body and advancing in a first direction in a second direction perpendicular to the first direction, and is rotatable around a rotation axis extending in the first direction,
the second rotation member includes a second reflecting member that reflects light reflected by the first reflecting member and advancing in the second direction, in a third direction perpendicular to the second direction, and is connected by the first rotation member in a state in which the second rotation member is rotatable around a rotation axis extending in the second direction,
the moving member is movable between the regulation position for regulating the rotation of the first rotation member and the regulation release position for releasing the regulating of the rotation of the first rotation member, and
the specific rotation state is a state in which the second direction is opposite to a vertical direction and the third direction is perpendicular to the first direction and the second direction in a first installation form of the main body in which the first direction is perpendicular to the vertical direction.

7. The projection apparatus according to claim 3,
wherein the first rotation member includes a first reflecting member that reflects light emitted from the main body and advancing in a first direction in a second direction perpendicular to the first direction, and is rotatable around a rotation axis extending in the first direction,
the second rotation member includes a second reflecting member that reflects light reflected by the first reflecting member and advancing in the second direction, in a third direction perpendicular to the second direction, and is connected by the first rotation member in a state in which the second rotation member is rotatable around a rotation axis extending in the second direction,
the moving member is movable between the regulation position for regulating the rotation of the first rotation member and the regulation release position for releasing the regulating of the rotation of the first rotation member, and
the specific rotation state is a state in which the second direction is opposite to a vertical direction and the third direction is perpendicular to the first direction and the second direction in a first installation form of the main body in which the first direction is perpendicular to the vertical direction.

8. The projection apparatus according to claim 4,
wherein the first rotation member includes a first reflecting member that reflects light emitted from the main body and advancing in a first direction in a second direction perpendicular to the first direction, and is rotatable around a rotation axis extending in the first direction,
the second rotation member includes a second reflecting member that reflects light reflected by the first reflecting member and advancing in the second direction, in a third direction perpendicular to the second direction, and is connected by the first rotation member in a state in which the second rotation member is rotatable around a rotation axis extending in the second direction,
the moving member is movable between the regulation position for regulating the rotation of the first rotation member and the regulation release position for releasing the regulating of the rotation of the first rotation member, and
the specific rotation state is a state in which the second direction is opposite to a vertical direction and the third direction is perpendicular to the first direction and the second direction in a first installation form of the main body in which the first direction is perpendicular to the vertical direction.

9. The projection apparatus according to claim 5, further comprising:
a driving unit that electrically drives the moving member,
wherein the driving unit moves the moving member to the regulation position in a case of being determined that the specific rotation state is made, and moves the moving member to the regulation release position in a case of being determined that the specific rotation state is not made,
the regulation mechanism includes a regulation releasing restriction member that fixes the moving member at the regulation position, and
the regulation releasing restriction member is configured by the driving unit.

10. The projection apparatus according to claim 6, further comprising:
a driving unit that electrically drives the moving member,
wherein the driving unit moves the moving member to the regulation position in a case of being determined that the specific rotation state is made, and moves the moving member to the regulation release position in a case of being determined that the specific rotation state is not made,
the regulation mechanism includes a regulation releasing restriction member that fixes the moving member at the regulation position, and the regulation releasing restriction member is configured by the driving unit.

11. The projection apparatus according to claim 9, further comprising:
a posture sensor that detects a posture of the main body; and
an installation form determination unit that determines whether an installation form of the main body is the first installation form or a second installation form in which the first direction is opposite to the vertical direction based on detection information of the posture sensor,
wherein the driving unit moves the moving member to the regulation release position in a case of being determined that the installation form of the main body is the second installation form.

12. The projection apparatus according to claim 5,
wherein the moving member is a columnar member which is movable in the second direction and a direction opposite to the second direction, and is supported by the first rotation member,
the second rotation member has a pressing member for pressing one end of the moving member in the opposite direction of the second direction in the specific rotation state to move the moving member to the regulation position,
the projection apparatus further comprises an abutting member supported by the main body, which abuts against the moving member in the first installation form and in a state in which the moving member is in the regulation position,
the rotation of the first rotation member is regulated by a contact between the abutting member and the moving member,
the regulation mechanism includes a regulation releasing restriction member that fixes the moving member at the regulation position, and
the regulation releasing restriction member is configured by the pressing member.

13. The projection apparatus according to claim 12, further comprising:
a tubular member that is fixed to the main body,
wherein the abutting member is a member that is inserted into a hollow portion of the tubular member and is movable in the hollow portion, and
the abutting member is in a state of being moved to a position where the abutting member overlaps a moving path of the one end of the moving member as viewed from a direction perpendicular to the first direction and the second direction in the first installation form of the main body, and moved to a position where the abutting member does not overlap the moving path in a second installation form of the main body in which the first direction is opposite to the vertical direction.

14. The projection apparatus according to claim 5,
wherein the moving member is a member which is movable in the first direction and a direction opposite to the first direction, and is supported by the main body,
the second rotation member has a pressing member for pressing one end of the moving member in the opposite direction of the first direction in the specific rotation state to move the moving member to the regulation position,
a movement of the moving member in the first direction is restricted by the pressing member in a state in which the moving member is pressed by the pressing member,
the regulation mechanism includes a regulation releasing restriction member that fixes the moving member at the regulation position, and
the regulation releasing restriction member is configured by the pressing member.

15. The projection apparatus according to claim 14,
wherein the moving member is configured by a first member, a second member, and a third member,
the first member is a member that is directly pressed by the pressing member in the specific rotation state,
the second member is a member for transmitting a pressing force applied to the first member in the specific rotation state to the third member,
the third member is a member having a protruding portion for regulating the rotation of the first rotation member,
the second member is inserted between the first member and the third member in the first installation form, and
the second member is retracted from between the first member and the third member in a second installation form of the main body in which the first direction is opposite to the vertical direction.

16. A projection apparatus having a light modulation element that spatially modulates light based on image data, and projecting the spatially modulated light onto a projection surface, the projection apparatus comprising:
a main body;
an optical unit that is rotatably supported by the main body and includes a projection optical system for projecting the spatially modulated light onto the projection surface, a first rotation member rotatably supported to the main body and a second rotation member rotatably supported to the first rotation member; and
a regulation mechanism that regulates at least rotation of the first rotation member,
wherein the regulation mechanism includes a moving member that is movable between a regulation position for regulating the rotation of the first rotation member and a regulation release position for releasing the regulating of the rotation, and fixes the moving member at the regulation position in a case where the first rotation member and the second rotation member are in a predetermined specific rotation state, and
the regulation mechanism releases the fixing by the rotation of the second rotation member in a case where the moving member is fixed at the regulation position.

17. The projection apparatus according to claim 16,
wherein the first rotation member includes a first reflecting member that reflects light emitted from the main body and advancing in a first direction in a second direction perpendicular to the first direction, and is in a state of being rotatable around a rotation axis extending in the first direction,
the second rotation member includes a second reflecting member that reflects light reflected by the first reflecting member and advancing in the second direction, in a third direction perpendicular to the second direction, and is connected to the first rotation member in a state in which the second rotation member is rotatable around a rotation axis extending in the second direction,
the moving member is movable between the regulation position for regulating the rotation of the first rotation member and the regulation release position for releasing the regulating of the rotation of the first rotation member, and the specific rotation state is a state in which the second direction is opposite to a vertical direction and the third direction is perpendicular to the first direction and the second direction in a first installation form of the main body in which the first direction is perpendicular to the vertical direction.

18. The projection apparatus according to claim 16, further comprising:
   a driving unit that electrically drives the moving member;
   a first sensor that detects a rotation position of the first rotation member;
   a second sensor that detects a rotation position of the second rotation member; and
   a controller that determines whether to be in the specific rotation state or not based on detection information of the first sensor and the second sensor,
   wherein the driving unit fixes the moving member at the regulation position in a case where the controller determines that the specific rotation state is made.

19. The projection apparatus according to claim 18, wherein the moving member is electrically driven.

20. The projection apparatus according to claim 16, wherein the first rotation member includes a first reflecting member that reflects light emitted from the main body and advancing in a first direction in a second direction perpendicular to the first direction, and is in a state of being rotatable around a rotation axis extending in the first direction,
   the projection apparatus is capable of taking a second installation form of the main body in which the first direction is opposite to a vertical direction, and
   the regulation mechanism releases, in a case where the rotation of the first rotation member is regulated, the regulating of the rotation of the first rotation member by the projection apparatus taking the second installation form.

* * * * *